(12) United States Patent
Katal et al.

(10) Patent No.: US 12,516,399 B2
(45) Date of Patent: *Jan. 6, 2026

(54) PROCESS AND SYSTEM FOR RECOVERING LITHIUM FROM LITHIUM-ION BATTERIES

(71) Applicant: GREEN LI-ION PTE. LTD., Singapore (SG)

(72) Inventors: Reza Katal, Parkville (AU); Ebrahim Akhondi, Yarraville (AU)

(73) Assignee: GREEN LI-ION PTE. LTD., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 18/674,300

(22) Filed: May 24, 2024

(65) Prior Publication Data

US 2024/0309489 A1 Sep. 19, 2024

Related U.S. Application Data

(63) Continuation of application No. 18/135,560, filed on Apr. 17, 2023, now Pat. No. 12,024,755.
(Continued)

(51) Int. Cl.
*C22B 3/02* (2006.01)
*C22B 26/12* (2006.01)
*H01M 10/54* (2006.01)

(52) U.S. Cl.
CPC ............ *C22B 26/12* (2013.01); *H01M 10/54* (2013.01)

(58) Field of Classification Search
CPC . C22B 26/12; C22B 3/02; C22B 3/08; H01M 10/54; Y02W 30/84
(Continued)

(56) References Cited

U.S. PATENT DOCUMENTS 3,690,844 A 9/1972 Flint et al.
3,852,044 A 12/1974 Neitzel et al.
(Continued)

FOREIGN PATENT DOCUMENTS

AU 2018276326 B2 7/2021
CA 3085965-D1 8/2019
(Continued)

OTHER PUBLICATIONS

Examination Report from Canadian Application No. 3188399 dated May 22, 2024.
(Continued)

*Primary Examiner* — Huy Tram Nguyen
(74) *Attorney, Agent, or Firm* — Harness Dickey & Pierce P.L.C.

(57) ABSTRACT

Systems and methods for recovering lithium (Li) from a lithium-ion battery waste stream including lithium sulfate ($Li_2SO_4$), sodium sulfate ($Na_2SO_4$), and water ($H_2O$) are provided. The systems may include an evaporator unit with an optional heating system and a crystallizer unit downstream or upstream of the evaporator unit for cooling and solidifying sodium sulfate ($Na_2SO_4$). A lithium recovery unit is disposed downstream of the crystallizer unit or the evaporator unit that generates lithium carbonate ($Li_2CO_3$) product. Methods include evaporating a portion of water from the waste stream to generate water vapor and an effluent stream, which is then cooled to solidify sodium sulfate ($Na_2SO_4$) in a crystallizer vessel. The solid sodium sulfate ($Na_2SO_4$) is removed and the effluent stream is heated, followed by introducing sodium carbonate ($Na_2CO_3$) to produce lithium carbonate ($Li_2CO_3$) product, which is then recovered.

24 Claims, 6 Drawing Sheets

Related U.S. Application Data

(60) Provisional application No. 63/332,025, filed on Apr. 18, 2022.

(58) Field of Classification Search
USPC .......................................................... 75/739
See application file for complete search history.

(56) References Cited

U.S. PATENT DOCUMENTS

| | | |
|---|---|---|
| 4,723,962 A | 2/1988 | Mehta |
| 5,160,631 A | 11/1992 | Frost et al. |
| 9,834,827 B2 | 12/2017 | Wang et al. |
| 10,023,464 B2 | 7/2018 | Cohen et al. |
| 10,522,884 B2 | 12/2019 | Wang et al. |
| 10,741,890 B2 | 8/2020 | Wang et al. |
| 11,127,992 B2 | 9/2021 | Wang et al. |
| 11,430,997 B2 | 8/2022 | Howe |
| 11,502,345 B2 | 11/2022 | Wang et al. |
| 11,508,999 B2 | 11/2022 | Morin et al. |
| 11,769,916 B2 | 9/2023 | Wang et al. |
| 11,827,998 B2 | 11/2023 | Wang et al. |
| 11,876,196 B2 | 1/2024 | Katal |
| 12,024,755 B2 * | 7/2024 | Katal ..................... C22B 26/12 |
| 2007/0098609 A1 | 5/2007 | McConnell |
| 2007/0196725 A1 | 8/2007 | Tedjar et al. |
| 2012/0328494 A1 | 12/2012 | Dreisinger et al. |
| 2013/0302226 A1 | 11/2013 | Wang et al. |
| 2013/0312254 A1 | 11/2013 | Kim et al. |
| 2016/0115563 A1 | 4/2016 | Kotiranta et al. |
| 2017/0077564 A1 | 3/2017 | Wang et al. |
| 2018/0261894 A1 | 9/2018 | Wang et al. |
| 2019/0123402 A1 | 4/2019 | Wang et al. |
| 2021/0032721 A1 | 2/2021 | Hanisch et al. |
| 2021/0032724 A1 | 2/2021 | Maree et al. |
| 2021/0078013 A1 | 3/2021 | Kochhar et al. |
| 2021/0123119 A1 | 4/2021 | Oosterhof et al. |
| 2021/0324495 A1 | 10/2021 | Rohde et al. |
| 2021/0344058 A1 | 11/2021 | Liu et al. |
| 2021/0372001 A1 | 12/2021 | Wang et al. |
| 2021/0384563 A1 | 12/2021 | Gratz et al. |
| 2021/0391606 A1 | 12/2021 | Wang et al. |
| 2022/0017991 A1 | 1/2022 | Lee et al. |
| 2022/0131204 A1 | 4/2022 | Wang et al. |
| 2022/0136084 A1 | 5/2022 | Rohde et al. |
| 2022/0166079 A1 | 5/2022 | Liu et al. |
| 2022/0205064 A1 | 6/2022 | Szolga, Jr. et al. |
| 2022/0285750 A1 | 9/2022 | Li et al. |
| 2022/0311068 A1 | 9/2022 | Wang et al. |
| 2022/0325378 A1 | 10/2022 | Wang et al. |
| 2022/0416325 A1 | 12/2022 | Gratz et al. |
| 2023/0038978 A1 | 2/2023 | Gratz et al. |
| 2023/0044374 A1 | 2/2023 | Wang et al. |
| 2023/0059571 A1 | 2/2023 | Arsenault et al. |
| 2023/0147371 A1 | 5/2023 | Wang et al. |
| 2023/0198040 A1 | 6/2023 | Wang et al. |
| 2023/0304128 A1 | 9/2023 | Akhondi et al. |
| 2023/0332272 A1 | 10/2023 | Katal et al. |
| 2024/0102127 A1 | 3/2024 | Alemrajabi et al. |
| 2024/0120565 A1 | 4/2024 | Katal |
| 2024/0347803 A1 | 10/2024 | Chen et al. |

FOREIGN PATENT DOCUMENTS

| | | |
|---|---|---|
| CA | 3109084 A1 | 2/2020 |
| CN | 101450815 A | 6/2009 |
| CN | 101847663 A | 9/2010 |
| CN | 102157726 A | 8/2011 |
| CN | 102892708 A | 1/2013 |
| CN | 104953200 A | 9/2015 |
| CN | 103280610 B | 11/2015 |
| CN | 105274332 A | 1/2016 |
| CN | 106505225 A | 3/2017 |
| CN | 106505272 A | 3/2017 |
| CN | 107190150 A | 9/2017 |
| CN | 107653378 A | 2/2018 |
| CN | 107871912 A | 4/2018 |
| CN | 107946687 A | 4/2018 |
| CN | 109075407 A | 12/2018 |
| CN | 109231181 A | 1/2019 |
| CN | 110527836 A | 12/2019 |
| CN | 110563021 A | 12/2019 |
| CN | 111003736 A | 4/2020 |
| CN | 109402394 B | 6/2020 |
| CN | 111304441 A | 6/2020 |
| CN | 111471864 A | 7/2020 |
| CN | 111675203 A | 9/2020 |
| CN | 112126783 A | 12/2020 |
| CN | 112441572 A | 3/2021 |
| CN | 112701372 A | 4/2021 |
| CN | 113073194 A | 7/2021 |
| CN | 113957252 A | 1/2022 |
| CN | 115058605 A | 9/2022 |
| EP | 2532759 A1 | 12/2012 |
| EP | 2450991 B1 | 7/2013 |
| EP | 2480696 B1 | 7/2018 |
| EP | 3381080 A1 | 10/2018 |
| GB | 2611158 A | 3/2023 |
| JP | 2011157604 A | 8/2011 |
| JP | 2011184764 A | 9/2011 |
| JP | 5161361 B1 | 3/2013 |
| JP | 2014156648 A | 8/2014 |
| JP | 2014156649 A | 8/2014 |
| JP | 2016003382 A | 1/2016 |
| JP | 2016060926 A | 4/2016 |
| JP | 2020522617 A | 7/2020 |
| JP | 2021507111 A | 2/2021 |
| JP | 2021512215 A | 5/2021 |
| JP | 2021147637 A | 9/2021 |
| KR | 20110062307 A | 6/2011 |
| KR | 20190009771 A | 1/2019 |
| KR | 102202646 B1 | 1/2021 |
| KR | 20210120669 A | 10/2021 |
| KR | 102744673 B1 | 12/2024 |
| RU | 2604082 C2 | 12/2016 |
| TW | 202105823 A | 2/2021 |
| TW | 202107764 A | 2/2021 |
| TW | 202111131 A | 3/2021 |
| WO | WO-2012026061 A1 | 3/2012 |
| WO | WO-2013160754 A1 | 10/2013 |
| WO | WO-2017091562 A1 | 6/2017 |
| WO | WO-2018209164 A1 | 11/2018 |
| WO | WO-2018223193 A1 | 12/2018 |
| WO | WO-2018227237 A1 | 12/2018 |
| WO | WO-2019149698 A1 | 8/2019 |
| WO | WO-2019150403 A1 | 8/2019 |
| WO | WO-2020109045 A1 | 6/2020 |
| WO | WO-2020124130 A1 | 6/2020 |
| WO | 2020171009 A1 | 8/2020 |
| WO | WO-2020220559 A1 | 11/2020 |
| WO | WO-2021069822 A1 | 4/2021 |
| WO | WO-2021161316 A1 | 8/2021 |
| WO | WO-2021177537 A1 | 9/2021 |
| WO | WO-21252433 A1 | 12/2021 |
| WO | WO-2021242831 A2 | 12/2021 |
| WO | WO-21252433 A9 | 1/2022 |
| WO | WO-2022045973 A1 | 3/2022 |
| WO | WO-2022062675 A1 | 3/2022 |
| WO | WO-2022127117 A1 | 6/2022 |
| WO | WO-2022167662 A1 | 8/2022 |
| WO | WO-2022219221 A1 | 10/2022 |
| WO | WO-2022219222 A1 | 10/2022 |
| WO | WO-2022219223 A1 | 10/2022 |
| WO | WO-2022221285 A1 | 10/2022 |
| WO | WO-202272162 A1 | 12/2022 |
| WO | WO-2022258939 A1 | 12/2022 |
| WO | WO-2023010969 A1 | 2/2023 |
| WO | WO-2023015171 A1 | 2/2023 |
| WO | WO-2023024599 A1 | 3/2023 |
| WO | WO-2023034556 A1 | 3/2023 |
| WO | WO-2023036726 A1 | 3/2023 |

(56) References Cited

FOREIGN PATENT DOCUMENTS

| | | |
|---|---|---|
| WO | WO-2023136773 A1 | 7/2023 |
| WO | WO-2023163658 A2 | 8/2023 |

OTHER PUBLICATIONS

Pavon et al. Recovery of Al, Co, Cu, Fe, Mn, and Ni from Spent LIBs after Li Selective Separation by COOL-Process—Part 2: Solvent Extraction from Sulphate Leaching Solution, Oct. 1, 2022, Chemie IngenieurTechnik, 93, p. 1842.
Vittore et al. Edge-Oxidation of Graphites by Hydrogen Peroxide, Langmuir, 35, p. 2244.
Non-Final Office Action from U.S. Appl. No. 18/640,456 dated Jul. 12, 2024.
International Search Report and Written Opinion from PCT Application No. PCT/SG2024/050258 dated Jul. 22, 2024.
International Search Report and Written Opinion from PCT Application No. PCT/SG2024/050259 dated Jul. 22, 2024.
Office Action from Japanese Application No. 2024-513842 dated Jan. 7, 2025.
International Search Report and Written Opinion for International Publication No. WO 2022/045973-A1 issued Oct. 11, 2021; 23 pages.
International Search Report from PCT Application No. PCT/SG2021/050496 dated Nov. 10, 2021.
Written Opinion from PCT Application No. PCT/SG2021/050496 dated Nov. 10, 2021.
Xu, J., et al., "A review of the processes and technologies for the recycling of lithium-ion secondary batteries," Journal of Power Sources, 177: 512-527 (2008).
Freitas, M.B.J.G. & Garcia, E.M., "Electrochemical recycling of cobalt from cathodes of spent lithium-ion batteries," Journal of Power Sources, 171: 953-959 (2007).
Castillo, S., et al., "Advances in the recovering of spent lithium battery compounds," Journal of Power Sources, 112: 247-254 (2002).
Contestabile, M., et al., "A laboratory-scale lithium battery recycling process," Journal of Power Sources, 83: 75-78 (1999).
Zou, H., et al., "A novel method to recycle mixed cathode materials for lithium ion batteries," Green Chem, 15: 1183-1191 (2013).
Gratz, E., et al., "A closed loop process for recycling spent lithium ion batteries," Journal of Power Sources, 262: 255-262 (2014).
Office Action from U.S. Appl. No. 18/112,818 dated Jun. 22, 2023.
Wang, H., et al., "Hydrometallurigcal processing of Li-Ion battery scrap from electric vehicles," European Metallurgical Conference, 2011, p. 1-26.
Office Action from Chinese Application No. 2021800522141 dated Aug. 28, 2023.
Office Action from Russian Application No. 2023106877 dated Sep. 12, 2023.
Search Report from Russian Application No. 2023106877 dated Sep. 11, 2023.
Bing Han, Rana Anwar Ul Haq, Marjatta Louhi-Kultanen, Lithium carbonate precipitation by homogeneous and heterogeneous reactive crystallization, 2020, Hydrometallurgy, vol. 195, (Year: 2020).
O. Sitando, P.L. Crouse, Processing of a Zimbabwean petalite to obtain lithium carbonate, 2012, International Journal of Mineral Processing, vols. 102-103 (Year: 2012).
Ulusoy Erol HB, Hestekin CN, Hestekin JA. Effects of Resin Chemistries on the Selective Removal of Industrially Relevant Metal ions Using Wafer-Enhanced Electrodeionization. 2021. Membranes. 11 (1):45. https://doi.org/10.3390/membranes11010045 (Year:2021).
Gao et al. Lithium Carbonate Recovery from Cathode Scrap of Spent Lithium-Ion Battery A Closed-Loop Process, Jan. 12, 2017, Environmental Science & Technology 51 (3), 1662-1669, (Year: 2017).
Chao Peng, Fupeng Liu, Zulin Wang, Benjamin P. Wilson, Mari Lundstrom, Selective extraction of lithium (Li) and preparation of battery grade lithium carbonate (Li2C03) from spent Li-ion batteries in nitrate system, Journal of Power Sources, vol. 415, 2019, pp. 179-188 (Year: 2019).
Ahwadmin, What is Deionized Water, and What is it Used For?, Oct. 21, 2021, American Home Water & Air (Year: 2021).
Sina Shakibania, Alireza Mahmoudi, Mohammad Mokmeli, Fereshteh Rashchi, The effect of the chloride ion on chemical degradation of LIX 984N extractant, 2020,Minerals Engineering (Year: 2020).
Office Action from U.S. Appl. No. 18/112,676, dated Oct. 24, 2023.
Search Report from Taiwan Application No. 112114238 dated Nov. 8, 2023.
Search Report and Office Action from Taiwan application No. 112106545 dated Oct. 16, 2023.
Office Action from Chinese Application No. 2021800522141 dated Dec. 4, 2023.
Examination Report from Australian Application No. 2021330014 dated Apr. 19, 2023.
Examination Report from Australian Application No. 2021330014 dated Nov. 22, 2023.
International Search Report from PCT Application No. PCT/SG2023/050108 dated Aug. 16, 2023.
Written Opinion from PCT Application No. PCT/SG2023/050108 dated Aug. 16, 2023.
International Search Report from PCT Application No. PCT/SG2023/050257 dated Aug. 2, 2023.
Written Opinion from PCT Application No. PCT/SG2023/050257 dated Aug. 2, 2023.
Ooi et al., (2017), "Recovery of lithium from salt-brine eluates by direct crystallization as lithium sulfate", Hydrometallurgy, 174, 123-130.
Rosales et al., (2014), "Novel process for the extraction of lithium from ?-spodumene by leaching with HF", Hydrometallurgy, 147-148.
Non-Final Office Action issued in U.S. Appl. No. 18/379,807 dated Dec. 5, 2023.
International Search Report and Written Opinion from PCT Application No. PCT/SG2022/050014 dated Mar. 28, 2022.
Office Action from Korean Application No. KR 10-2023-7010188 dated Jan. 17, 2024.
Larouche, F. et al. (2020). Progress and Status of Hydrometallurgical and Direct Recycling of Li-Ion Batteries and Beyond. Materials 13:801.
Forte, F. et al. (2020). Lithium iron phosphate batteries recycling: An assessment of current status. Critical Reviews in Environmental Science and Technology, 1064:3389.
Yan et al. (2020). High-efficiency method for recycling lithium from spent LiFePO4 cathode. Nanotechnology Reviews, 9: 1586-1593.
Tasaki K. et al. (2003). Decomposition of LiPF6 and Stability of PF 5 in Li-Ion Battery Electrolytes: Density Functional Theory and Molecular Dynamics Studies. Journal of the Electrochemical Society 150.12, A1628.
Search Report and Written Opinion from Singapore Application No. 11202301039V dated Feb. 26, 2024.
Final Office Action from U.S. Appl. No. 18/112,676 dated Mar. 8, 2024.
Examination Report from Australian Application No. 2021330014 dated Feb. 23, 2024.
Examination Report from Australian Application No. 2023223959 dated Mar. 13, 2024.
Press et al. (2020). A Process for Recovering Metals From Recycled Rechargeable Batteries.
Extended European Search Report from European Application No. 21862212.4 dated May 3, 2024.
International Search Report and Written Opinion from PCT Application No. PCT/SG2024/050542 dated Dec. 20, 2024.
First Office Action for Japanese Patent Application No. 2024513841 issued Mar. 18, 2025.
First Office Action for Taiwan Patent Application No. 113119542 issued Feb. 10, 2025.
Second Examination Report for Canadian Patent Application No. 3,224,303 issued Feb. 25, 2025.

(56) References Cited

OTHER PUBLICATIONS

Third Party Submission of Prior Art from Canadian Application No. 3224807 dated Feb. 21, 2025.

* cited by examiner

PROCESS AND SYSTEM FOR RECOVERING LITHIUM FROM LITHIUM-ION BATTERIES

CROSS-REFERENCE TO RELATED APPLICATIONS

This application is a continuation of U.S. patent application Ser. No. 18/135,560 filed Apr. 17, 2023, which claims the benefit of U.S. Provisional Application No. 63/332,025, filed Apr. 18, 2022. The entire disclosures of the above applications are incorporated herein by reference.

FIELD

The present disclosure relates to systems and processes for recovering lithium (Li) as a lithium carbonate ($Li_2CO_3$) product from lithium-ion battery waste streams.

BACKGROUND

This section provides background information related to the present disclosure which is not necessarily prior art.

Electrochemical cells, such as rechargeable secondary lithium-ion batteries, are widely used in a variety of applications including consumer products and vehicles as energy storage units. Lithium-ion batteries have a high energy density, high cell voltage, low storage life, low discharge rate, and a wide temperature range of use. However, the estimated lifespan of such lithium-ion batteries is estimated to be approximately 3 to 10 years, after which spent batteries are discarded. As such, lithium-ion batteries (LIB) often contain valuable metals, including lithium that could go to waste, making recycling pivotal.

According to the U.S. geological survey, the lithium market is driven by demand from various industries, including not only batteries, but also ceramics, glass, and lubrication, among others. Lithium is usually extracted from brine and mineral ores, with the world's crude lithium production amounting to nearly 40,000 tonnes yearly. However, demand for lithium grows every year, necessitating the need to recycle lithium and the associated constituents of lithium-ion batteries. The recycling of lithium-ion batteries containing lithium will conserve precious metal ores that are dwindling across the globe and reduce the environmental problems associated with electronic waste disposal.

During hydrometallurgical and purification processes, lithium is usually obtained in the form of lithium carbonate ($Li_2CO_3$). Lithium carbonate is not only used as a precursor that forms positive electrode/cathode materials in lithium ion batteries, but is also used to create other compounds, such as lithium chloride (LiCl), lithium bromide (LiBr), and lithium oxide ($Li_2O$). LiCl, LiBr, and $Li_2O$ can be raw materials for other industries. For example, LiBr can be used as an absorbent and a refrigerant. In the medical industry, lithium carbonate can also be used as an active ingredient in treating bipolar disorder. It would be desirable to be able to recycle waste streams from lithium-ion batteries to form products for beneficial reuse, including lithium carbonate ($Li_2CO_3$) product.

SUMMARY

This section provides a general summary of the disclosure, and is not a comprehensive disclosure of its full scope or all of its features.

In certain aspects the present disclosure relates to a system for recovering lithium from a lithium-ion battery waste stream. In certain aspects, the system comprises an evaporator having an inlet, a first outlet, and a second outlet and a crystallizer unit comprising (i) at least one cooler and (ii) a crystallizer vessel that comprises an inlet, a first outlet, and a second outlet. In one variation, the inlet of the evaporator receives a liquid stream comprising lithium sulfate ($Li_2SO_4$), sodium sulfate ($Na_2SO_4$), and water ($H_2O$). At least a portion of the water from the liquid stream is evaporated in the evaporator to generate water vapor that passes through the second outlet and an effluent stream that passes through the first outlet. The crystallizer unit is downstream of the evaporator that receives and cools the effluent stream to form solid sodium sulfate ($Na_2SO_4$). The inlet of the crystallizer vessels receives the effluent stream from the first outlet of the evaporator, a byproduct comprising the solid sodium sulfate ($Na_2SO_4$) is removed via the first outlet of the crystallizer vessel, and a second effluent stream is removed via the second outlet of the crystallizer vessel. In an alternative variation, the crystallizer unit receives and cools the liquid stream to form solid sodium sulfate ($Na_2SO_4$). The inlet of the crystallizer vessel receives the liquid stream, a byproduct comprising the solid sodium sulfate ($Na_2SO_4$) is removed via the first outlet of the crystallizer vessel, and a third effluent stream is removed via the second outlet of the crystallizer vessel. The inlet of the evaporator receives the third effluent stream comprising lithium sulfate ($Li_2SO_4$) and water ($H_2O$) and at least a portion of the water from the third effluent stream is evaporated in the evaporator to generate water vapor that passes through the second outlet and a fourth effluent stream that passes through the first outlet. The system also comprises a lithium recovery unit downstream of the crystallizer unit or the evaporator. The lithium recovery unit comprises: (i) a reactor that comprises a first inlet that receives the second effluent stream from the crystallizer unit or the fourth effluent stream from the evaporator, a second inlet that receives sodium carbonate ($Na_2CO_3$), an outlet, and an agitator; (ii) a heat source in thermal communication with the reactor; and (iii) a solid-liquid separator in fluid communication with the outlet of the reactor and through which a product stream passes and is separated into a retentate comprising lithium carbonate ($Li_2CO_3$) product and a waste stream. The system further includes a fluid conduit for establishing fluid communication between the evaporator, the crystallizer unit, and the lithium recovery unit, and at least one pump for circulating fluids within the fluid conduit.

In one aspect, the system further comprises a heating system upstream of the evaporator comprising at least one heater for heating the liquid stream prior to entering the evaporator.

In one further aspect, the heater is a preheater and the heating system further comprises a heat exchanger downstream of the preheater that receives water vapor from the evaporator and the liquid stream in a heat exchange relationship to increase a temperature of the liquid stream.

In one further aspect, the heating system further comprises a compressor disposed between the evaporator and the heat exchanger to increase at least one of pressure and temperature of the water vapor prior to entering the heat exchanger.

In one further aspect, the at least one cooler comprises a heat exchanger that receives the liquid stream and the third effluent stream in a heat exchange relationship to decrease a temperature of the liquid stream and to increase a temperature of the third effluent prior to entering the evaporator.

In one aspect, the crystallizer unit further comprises a plurality of coolers upstream of the crystallizer vessel.

In one further aspect, at least one of the plurality of coolers receives a stream from the crystallizer vessel and the liquid stream that are in a heat exchange relationship with one another to reduce a temperature of the liquid stream.

In one aspect, the crystallizer unit further comprises a centrifuge downstream of the first outlet of the crystallizer vessel that receives the byproduct comprising the solid sodium sulfate ($Na_2SO_4$) and separates liquid from sodium sulfate ($Na_2SO_4$) solids.

In one further aspect, the crystallizer unit further comprises a plurality of coolers upstream of the crystallizer vessel and at least one of the plurality of coolers receives liquid from the centrifuge that is in a heat exchange relationship with the liquid stream to reduce a temperature of the liquid stream.

In one aspect, the solid-liquid separator is selected from the group consisting of: a pneumatic filter and a centrifuge.

In certain other aspects, the present disclosure relates to a process for recovering lithium from a lithium-ion battery waste stream. In certain aspects, the process comprises solidifying sodium sulfate ($Na_2SO_4$) from a liquid stream comprising lithium sulfate ($Li_2SO_4$), sodium sulfate ($Na_2SO_4$), and water ($H_2O$). In one variation, the solidifying sodium sulfate ($Na_2SO_4$) comprises evaporating a portion of water in the liquid stream comprising lithium sulfate ($Li_2SO_4$), sodium sulfate ($Na_2SO_4$), and water ($H_2O$) to generate water vapor and an effluent stream. The process also comprises cooling the effluent stream and solidifying sodium sulfate ($Na_2SO_4$) from the effluent stream in a crystallizer vessel to generate a second effluent stream. In an alternative variation, the solidifying sodium sulfate ($Na_2SO_4$) comprises cooling the liquid stream and solidifying sodium sulfate ($Na_2SO_4$) from the liquid stream in a crystallizer vessel to generate a third effluent stream and evaporating a portion of water in the third effluent stream to generate water vapor and a fourth effluent stream. Then, the process comprises removing the sodium sulfate ($Na_2SO_4$) solids from the second effluent stream or the third effluent stream, followed by heating the second effluent stream or the fourth effluent stream and introducing sodium carbonate ($Na_2CO_3$) to the second effluent stream or the fourth effluent stream to produce a lithium carbonate ($Li_2CO_3$) product stream. Finally, the process comprises separating lithium carbonate ($Li_2CO_3$) from the lithium carbonate ($Li_2CO_3$) product stream.

In one aspect, the process further comprises heating the liquid stream prior to the evaporating to a temperature of greater than or equal to about 90° C.

In one aspect, the process further comprises heating the third effluent stream prior to the evaporating to a temperature of greater than or equal to about 90° C.

In one further aspect, the heating the liquid stream further comprises exchanging heat with the water vapor generated during the evaporating.

In one further aspect, the heating the third effluent stream further comprises exchanging heat with the liquid stream.

In one further aspect, the process further comprises compressing the water vapor prior to exchanging heat with the liquid stream.

In one aspect, the heating the second effluent stream or the fourth effluent stream is to a temperature of greater than or equal to about 80° C. to less than about 100° C. and the process comprises maintaining the temperature during the introducing of sodium carbonate ($Na_2CO_3$).

In one aspect, the introducing of sodium carbonate ($Na_2CO_3$) provides a stoichiometric excess sodium carbonate ($Na_2CO_3$) of greater than or equal to about 10% to less than or equal to about 15%.

In one aspect, the cooling the effluent stream or the liquid stream is to a temperature of less than or equal to about 0° C.

In one further aspect, the cooling occurs in multiple cooling stages. In a first cooling stage the temperature of the effluent stream or the liquid stream is reduced to less than or equal to about 40° C. In a second cooling stage, the temperature of the effluent stream or the liquid stream is reduced to less than or equal to about 30° C., and in a third cooling stage the temperature of the effluent stream or the liquid stream is reduced to less than or equal to about −2° C.

In one aspect, the cooling the liquid stream comprises exchanging heat with the third effluent generated in the crystallizer vessel.

In one aspect, the removing the sodium sulfate ($Na_2SO_4$) solids from the second or third effluent stream occurs by centrifuging a byproduct stream comprising the sodium sulfate ($Na_2SO_4$) solids to separate liquids and collect the sodium sulfate ($Na_2SO_4$) solids.

In one aspect, the lithium carbonate ($Li_2CO_3$) product has a purity level of greater than or equal to about 80% by weight.

In one further aspect, a portion of the fourth effluent stream is combined with the liquid stream.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
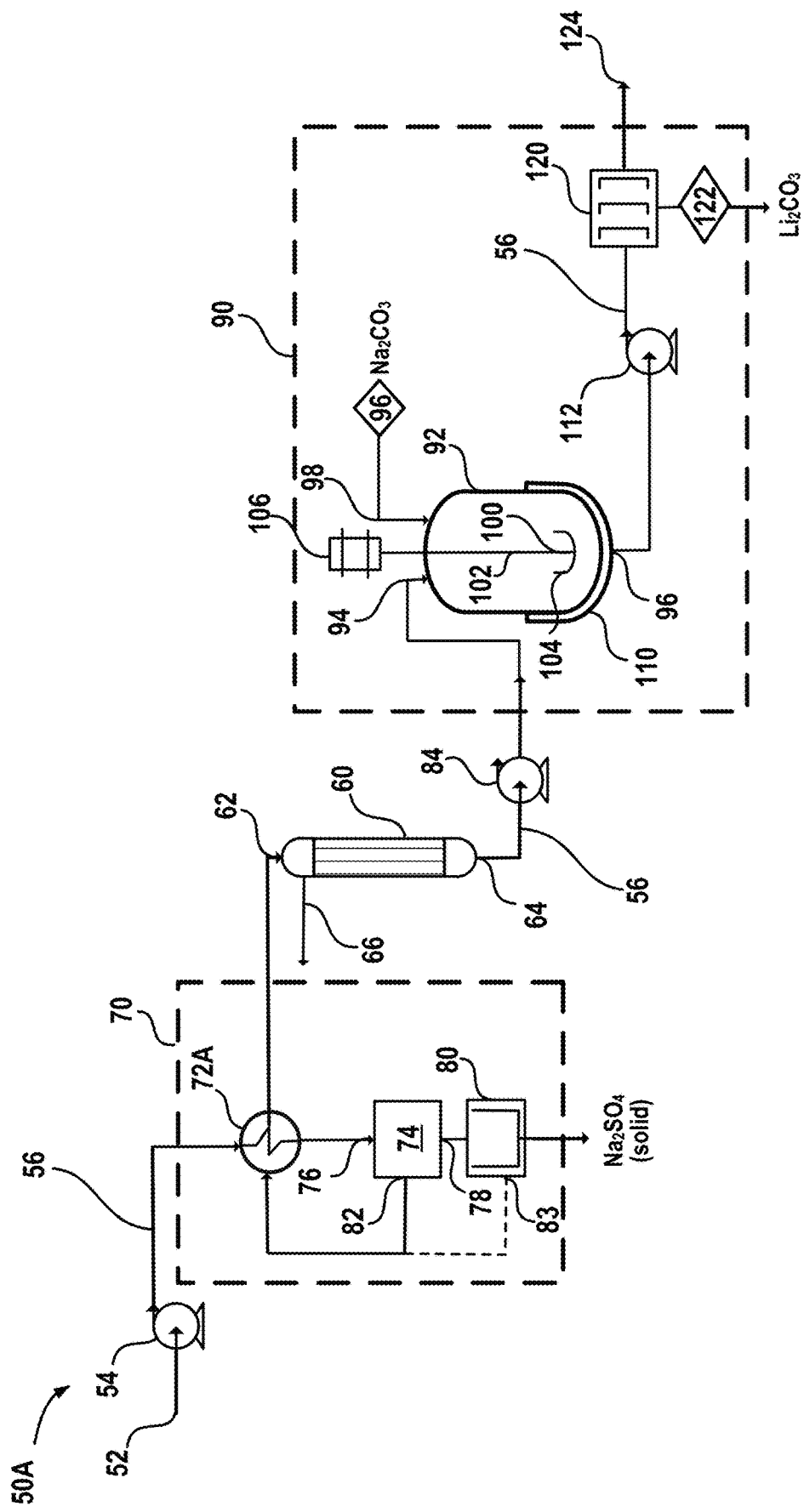
Figure 6:
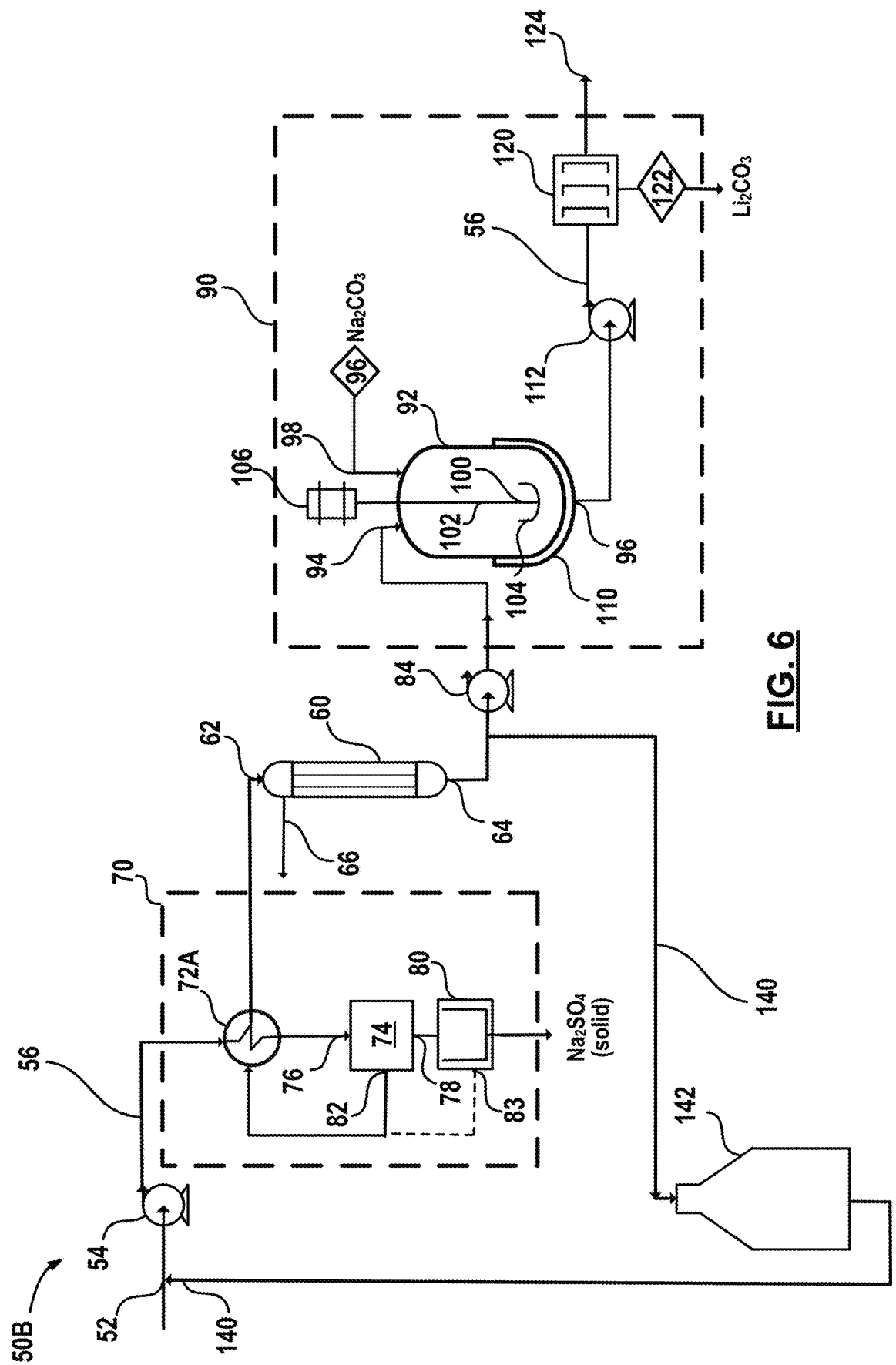

FIG. 5 shows an alternative system for recovering lithium from a waste stream derived from a lithium-ion battery according to certain variations of the present disclosure, including a crystallization unit upstream of an evaporator; and FIG. 6 shows an alternative system for recovering lithium from a waste stream derived from a lithium-ion battery according to certain variations of the present disclosure, including a crystallization unit upstream of an evaporator where the system further includes a reflux stream.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges. Thus ranges are, unless specified otherwise, inclusive of endpoints and include disclosure of all distinct values and further divided ranges within the entire range. Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

Unless otherwise indicated, compositional amounts are on a mass basis. Further, if an amount is expressed as a weight, it may be used interchangeably with mass, but should be understood to reflect a mass of a given component.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

In the figures, the direction of an arrow, as indicated by the arrowhead, generally demonstrates the flow of material or information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit," for example, when used in the context of a computing device or module, etc. The term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module and/or controller may include one or more interface circuits. In some examples, the interface circuits may include wired or wireless interfaces that are connected to a local area network (LAN), the Internet, a wide area network (WAN), or combinations thereof. The functionality of any given module and/or controller of the present disclosure may be distributed among multiple modules and/or controllers that are connected via interface circuits. For example, multiple modules and/or controllers may allow load balancing. In a further example, a server (also known as remote, or cloud) module and/or controller may accomplish some functionality on behalf of a client module and/or controller.

The term code, as used above, may include software, firmware, and/or microcode, and may refer to programs, routines, functions, classes, data structures, and/or objects. The term shared processor circuit encompasses a single processor circuit that executes some or all code from multiple modules and/or controllers. The term group processor circuit encompasses a processor circuit that, in combination with additional processor circuits, executes some or all code from one or more modules and/or controllers. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules and/or controllers. The term group memory circuit encompasses a memory circuit that, in combination with additional memories, stores some or all code from one or more modules and/or controllers.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Example embodiments will now be described more fully with reference to the accompanying drawings.

In various aspects, the present disclosure contemplates forming one or more recycled products from a lithium-ion battery waste stream, where at least one of the recycled products comprises lithium (Li). In certain variations, the recycled product comprising lithium (Li) may include lithium carbonate ($Li_2CO_3$). The present disclosure also contemplates forming sodium sulfate ($Na_2SO_4$) as a byproduct for beneficial reuse in certain variations. The present disclosure also contemplates systems for recovering recycled lithium-containing products from the lithium-ion battery waste stream.

Lithium-ion battery waste streams are formed from lithium-ion batteries after they are dismantled, crushed, and/or shredded. Such a waste stream may be a material known as black mass that is intended for recycling. The black mass may collectively include portions of one or more spent lithium-ion batteries, including portions from different types (e.g., having different active materials) of lithium-ion batteries. The black mass typically includes all active materials, so it may contain anodic active materials and electrolytic constituents mixed with cathodic active materials. In some examples, spent lithium-ion batteries may include positive electrodes/cathodes made from lithium cobalt oxide (LCO), lithium manganese oxide (LMO), lithium nickel manganese cobalt oxides (NMC), lithium iron phosphate (LFP), lithium nickel cobalt aluminum oxide (NCA), lithium titanate (LTO), and the like. See for example, Table 1 showing a list of common commercial battery active material combinations. The spent lithium-ion batteries may include negative electrodes/anodes made from graphite, lithium titanate oxide ($Li_2TiO_3$-LTO), lithium metal, and the like.

TABLE 1

| Type | Cathode | Anode |
| --- | --- | --- |
| Lithium Cobalt Oxide (LCO or Li-cobalt) | $LiCoO_2$ cathode (~60% Co) | Graphite |
| Lithium Manganese Oxide (LMO or Li-manganese) | $LiMn_2O_4$ | Graphite |
| Lithium Nickel Manganese cobalt Oxide (NMC) | $LiNiMnCoO_2$ | Graphite |
| Lithium Iron Phosphate (LFP or Li-phosphate) | $LiFePO_4$ | Graphite |
| Lithium Nickel Cobalt Aluminum Oxide (NCA or Li-aluminum) | $LiNiCoAlO_2$ (~9% Co) | Graphite |
| Lithium Titanate (LTO or Li-titanate) | NMC | $Li_2TiO_3$ |

Further, the black mass may include electrolytic constituents, including lithium salts, which may include fluorine, such as lithium hexafluorophosphate ($LiPF_6$). As a result, the black mass may comprise metals of interest to be recovered (e.g., precious metals), such as lithium (Li), nickel (Ni), manganese (Mn), cobalt (Co), and the like, as well as impurities, such as iron (Fe), copper (Cu), fluorine (F), phosphorous (P), titanium (Ti), aluminum (Al), and the like. It should be appreciated that the black mass composition may be subject to variations between batches depending on the types of lithium-ion batteries.

In various aspects, the systems and processes disclosed herein enable the recycling of spent lithium-ion batteries to recover and separate lithium from other components/impurities contained in black mass, so that lithium-containing species are recovered. By way of example, the methods and systems of the present disclosure provide the ability to process a lithium-ion battery waste stream to separate and recover lithium (Li) from a variety of other elements, including fluorine (F), phosphorus (P), copper (Cu), aluminum (Al), iron (Fe), carbon (C) (e.g., in the form of graphite), titanium (Ti), nickel (Ni), manganese (Mn), cobalt (Co), and combinations thereof. In certain aspects, lithium is extracted from spent lithium-ion batteries (LIB) by leaching that may form lithium sulfate ($Li_2SO_4$), which can then be reacted so that lithium can be recovered as lithium carbonate ($Li_2CO_3$).

In certain aspects, one or more separation and/or purification processes may be conducted upstream of the present systems and processes for recovering lithium to form a waste stream derived from lithium-ion battery waste stream. The waste stream may thus be a liquid stream that comprises lithium (Li), such as one or more lithium-containing compounds. In certain variations, the liquid stream derived from the lithium-ion battery waste stream comprises lithium sulfate ($Li_2SO_4$), sodium sulfate ($Na_2SO_4$), and water ($H_2O$). By way of non-limiting example, such waste streams may be formed in the processes and systems described in commonly owned U.S. patent application Ser. No. 18/112,676 filed on Feb. 22, 2023 entitled "PROCESSES AND SYSTEMS FOR PURIFYING AND RECYCLING LITHIUM-ION BATTERY WASTE STREAMS," PCT Application No. PCT/SG2021/050496 published as WO 2022/045973 on Mar. 3, 2022 entitled "PROCESS FOR REMOVING IMPURITIES IN THE RECYCLING OF LITHIUM-ION BATTERIES," and PCT Application No. PCT/SG2022/050014 filed on Jan. 17, 2022, entitled "PROCESS FOR RECYCLING LITHIUM IRON PHOSPHATE BATTERIES," the relevant portions of each of which are incorporated herein by reference. Various processes may involve using sodium hydroxide (NaOH) as an alkaline base to change the pH to achieve precipitation of precious metals during various hydrometallurgical processes in the recycling of lithium-ion battery derived waste streams. In certain of such processes described above, sulfates of various metals, such as nickel sulfate, manganese sulfate, and cobalt sulfate may be mixed and dissolved with sodium sulfate and lithium sulfate. The sulfates of nickel, manganese, and cobalt may be separated or otherwise recovered upstream (e.g., as precipitated products) from lithium sulfate and sodium sulfate. The present technology pertains to improved methods and systems for recovering and purifying lithium-containing compounds from sodium-containing compounds, such as separating lithium sulfate from sodium sulfate.

Generally, an initial concentration of lithium in the solution of the liquid stream is too low for effectively recycling lithium. Moreover, lithium (Li) and sodium (Na) pose particular challenges to achieve effective separation from one another, as both are IUPAC Periodic Table Group I elements. For example, sodium and lithium are extremely soluble in many liquid mediums. To exacerbate the difficulty of recovering lithium, the solubility products of both sodium and lithium salts are very close, such that in many solvent systems, sodium and lithium will be solidify simultaneously. In certain aspects, the present technology contemplates recovering significant amounts of lithium from the liquid waste stream. For example, the processes and systems contemplated herein extract substantial amounts of lithium sulfate ($Li_2SO_4$) from the liquid stream comprising sodium sulfate ($Na_2SO_4$) and water.

In certain aspects, where the lithium-ion battery waste stream initially includes lithium (Li), the lithium may be removed to a separation efficiency of greater than or equal to about 75% or any of the values specified below. The separation efficiency may be calculated by comparing an initial amount of lithium present in a stream before processing and a final amount of lithium present in a product after processing or separations. In certain aspects, a separation efficiency (η) for a given component, like lithium, can be expressed by $$\eta = 100 \times \left(\frac{x_i - x_f}{x_i}\right),$$

where $x_i$ is the initial amount (either mass or volume quantity) of lithium and $x_f$ is the final amount of the lithium after the separation process has been completed. In certain variations, an efficiency of separation using the inventive systems and methods for recovering lithium may be greater than or equal to about 75%, optionally greater than or equal to about 80%, optionally greater than or equal to about 85%, optionally greater than or equal to about 90%, optionally greater than or equal to about 95%, optionally greater than or equal to about 96%, optionally greater than or equal to about 97%, optionally greater than or equal to about 98%, and in certain variations, optionally greater than or equal to about 99% for lithium, as will be described in more detail below.

Generally, the present disclosure contemplates an economical method and system/plant for the recovery of a product comprising lithium, such as lithium carbonate ($Li_2CO_3$), from lithium-ion battery waste streams by providing a water recovery process to concentrate the lithium species present, while generating recovered lithium carbonate ($Li_2CO_3$) as a product and optionally generating sodium sulfate ($Na_2SO_4$) as a byproduct. The lithium carbonate ($Li_2CO_3$) may be economically reused in various industries, by way of non-limiting example, such as the lithium battery industry, the concrete industry, ceramics, and the production of clinkers and tiles, and the like.

The present disclosure generally provides both systems and processes for concentrating the lithium-containing species in the liquid stream to enhance recovery of the lithium. In certain variations, this process of concentrating the lithium-containing species is conducted in an energy efficient manner. In one variation, water may be separated from a heated liquid waste stream derived from lithium-ion battery waste, for example, comprising lithium sulfate, sodium sulfate, and water.

In certain variations, the present disclosure contemplates a process for recovering lithium from a lithium-ion battery waste stream that comprises solidifying sodium sulfate ($Na_2SO_4$) from a liquid stream comprising lithium sulfate ($Li_2SO_4$), sodium sulfate ($Na_2SO_4$), and water ($H_2O$).

In any embodiment, the solidifying sodium sulfate ($Na_2SO_4$) from the liquid stream include separating a portion of water from the liquid stream comprising lithium sulfate ($Li_2SO_4$), sodium sulfate ($Na_2SO_4$), and water ($H_2O$). The separating of a portion of the water may comprise vaporizing or evaporating a portion of water in a liquid stream to generate water vapor and a concentrated liquid or effluent stream. In certain variations, an amount of water removed (comparing an initial concentration of water in the waste stream to a final concentration after the vaporizing) during the separating/evaporating may be greater than or equal to about 70% by weight to less than or equal to about 90% by weight. A concentration of the lithium sulfate ($Li_2SO_4$) in the effluent stream after the separating may be greater than or equal to about 8 g/L to less than or equal to about 14 g/L and a concentration of sodium sulfate ($Na_2SO_4$) in the effluent stream may be greater than or equal to about 50 g/L to less than or equal to about 100 g/L, where greater than or equal to about 10% by weight to less than or equal to about 20% by weight of an initial amount of water remains in the effluent stream.

In one variation, the separation is conducted in an evaporator where at least a portion of the water is evaporated from the liquid stream to generate a concentrated liquid stream and water vapor or steam. There may be a single evaporator or multiple evaporators or condensers in parallel or series configurations.

In any embodiment, the liquid stream may be heated prior to evaporating, for example, by passing the liquid stream through one or more heaters, such as a preheater. In certain aspects, one or more preheaters or heat exchangers may be used to heat the liquid stream prior to entering the evaporator. For example, prior to the evaporating of water, the process may include heating the liquid to a temperature of greater than or equal to about 90° C., for example. In certain aspects, the effluent stream (heated liquid stream) has a temperature after the heating such that $Na_2SO_4$ concentration is near the saturation level.

The heater may be a heat exchanger that circulates a heat exchange medium or fluid, like water vapor/steam or air, or may have heating elements (electric, fuel-based, and the like) to heat the incoming liquid stream to a predetermined temperature prior to entering the evaporator. The heat exchangers may include finned tube, brazed plate, plate and frame, concentric, microchannel, or other heat exchangers. The liquid stream may travel in a first direction and the heat exchange medium in a second stream in a second direction that may be concurrent, countercurrent, or cross-exchange with respect to the first direction.

In certain aspects, the process is a continuous process and the water vapor/steam that is generated during the downstream evaporating may be recycled or circulated through a heat exchanger device to exchange heat with the liquid stream. In certain variations, the process may further comprise compressing the water vapor after it exits the evaporator by processing it in a compressor prior to exchanging heat with the liquid stream.

In this variation, the liquid may be preheated by a preheater, and the heating source may at least partially be the system's secondary steam condensate generated in the evaporator. After preheating, the liquid stream enters the evaporation system. Due to the complexity of the materials contained in the liquid stream, in order to avoid shutdown potentially caused by scaling and to enhance the stability of the system, in certain aspects, the feed flow rate may be automatically adjusted, and the separator/evaporator liquid level is maintained. As will be appreciated by those of skill in the art, feed flowrates will depend on the size or scale of the evaporation system.

In certain variations, the evaporation system adopts a forced circulation process and is equipped with an optional forced circulation pump. The forced circulation pump may be in the form of a compressor or other pump in order to ensure the high-speed flow of the material within (e.g., in the tubes of) the heat exchanger(s), and to prevent the material in the liquid stream from scaling and blocking internal flow conduits, such as tubes. In certain variations, the optional forced circulation pump may increase a pressure of the processed stream to greater than or equal to about 0.2 MPa to less than or equal to about 0.25 MPa. In certain aspects, the forced circulation process for the evaporation system provided by certain aspects of the present disclosure provides one or more of the following advantages: (1) the forced circulation evaporator may be used to avoid boiling on the heating surface to form fouling or crystallization; (2)

the circulation of the evaporated liquid in the equipment mainly relies on the forced flow of the circulating pump; (3) the material in the liquid stream does not evaporate in the heater, and the concentration will not change in the heat exchanger. Instead, the concentration will increase after flashing in the separating crystallizer (which may include the crystallizer vessel, any separation equipment, like a centrifuge, or in all of these devices), so it will not adhere to the heat exchange surface and cause fouling on the heat exchange surface; (4) the main body of the separation crystallizer has sufficient liquid/gas separation area and separation height, which can ensure long-term evaporation and stable discharge concentration. In one variation, the separation crystallizer may include a vessel that has internal dimensions ($\Phi$) of about 1,000 mm (1 m) by about 2,000 mm (2 m).

Figure 2:
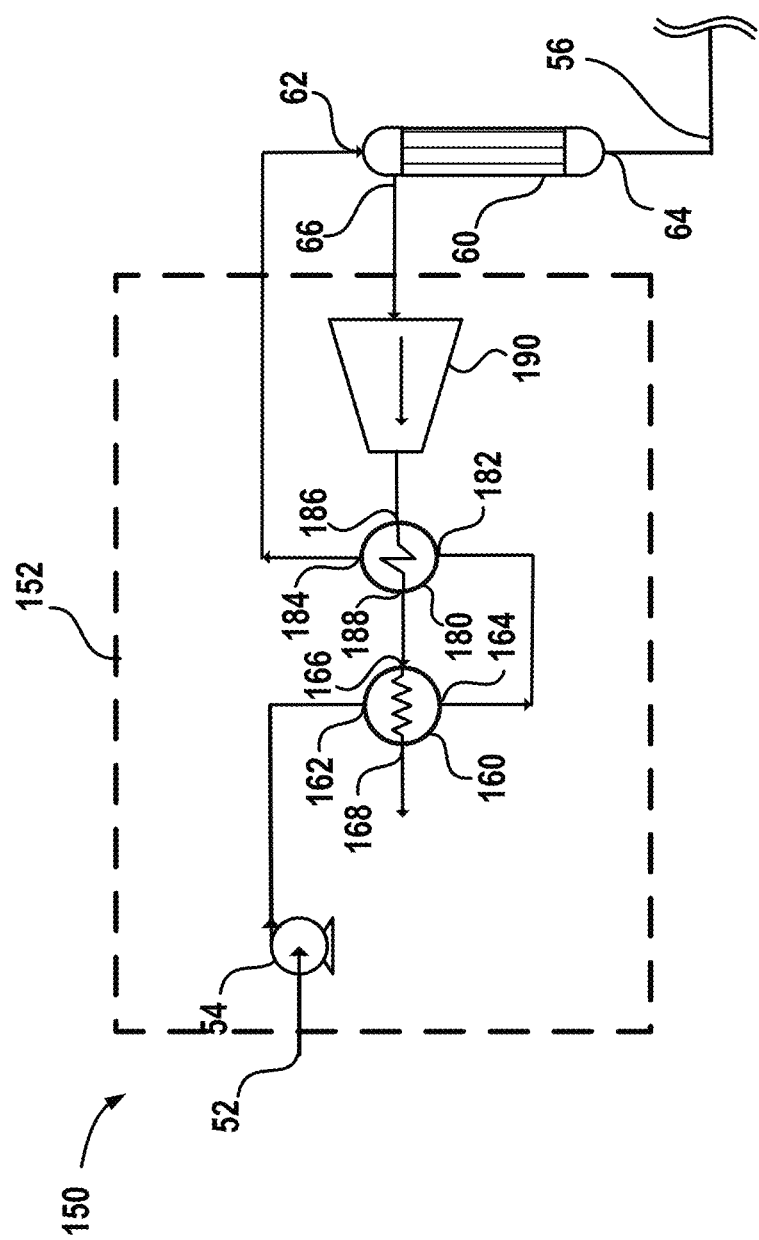
FIG. 2 shows a partial view of a system for recovering lithium according to certain alternative variations of the present disclosure, including a heater system upstream of an evaporation system.

In certain aspects, where a heat exchanger is provided for facilitating heat exchange from the water vapor/steam generated in the evaporator to the liquid stream, the methods provide certain advantages. For example, in certain aspects, an advantage of the systems and methods of the present disclosure having a heating system is that only a small amount of raw steam is required to supplement heat loss during normal/steady-state operations of the system, while some raw steam may be required for start-up. As shown in FIG. 2, the secondary steam generated by liquid stream evaporation enters the steam compressor and returns to the main heat exchanger after the compressor performs and increases the temperature and pressure, as the energy source for the material evaporation.

Moreover, after the secondary steam from the evaporator heats the liquid stream material, the water vapor/steam condenses into liquid water, which may be collected in a condensate tank (not shown), and then the condensate may be pumped to the condensate preheater to preheat the raw liquid, and the cooled condensate may then be discharged out of the system.

In certain further aspects, while not shown in the figures, after the non-condensable gas produced by the system is cooled by the non-condensable condenser (in the form of the heat exchanger) and the condensed water enters the condensate water tank, and the non-condensable gases are collected and may be further treated, for example, with activated carbon, before discharge.

After removing a portion of the water from the liquid stream in the evaporation portion of the system, so that the lithium sulfate ($Li_2SO_4$) and sodium sulfate ($Na_2SO_4$) are concentrated therein, the method further comprises cooling the effluent stream and solidifying sodium sulfate ($Na_2SO_4$) solids from the effluent stream in a crystallizer vessel.

In certain aspects, the cooling the effluent stream is to a temperature of less than or equal to about 20° C., optionally less than or equal to about 10° C., optionally less than or equal to about 5° C., optionally less than or equal to about 3° C., optionally less than or equal to about 0° C., optionally less than or equal to about −2° C., and in certain variations, optionally less than or equal to about −5° C. The cooling may occur in multiple cooling stages. In one example, the cooling stages may include three cooling phases, for example, a first cooling stage may reduce the temperature of the effluent stream to less than or equal to about 40° C., a second cooling stage may reduce the temperature of the effluent stream to less than or equal to about 30° C., and a third cooling stage reduces the temperature of the effluent stream to less than or equal to about −2° C.

At the predetermined temperature, the lithium sulfate ($Li_2SO_4$) remains soluble in the water in the concentrated liquid stream, while sodium sulfate ($Na_2SO_4$) solidify out of solution as a solid. The cooled concentrated liquid effluent stream may then pass into a downstream crystallizer/crystallization unit that receives the concentrated liquid stream where sodium sulfate ($Na_2SO_4$) solids are generated. In certain aspects, the crystallizer unit comprises a crystallizer/crystallization reactor or vessel and at least one upstream cooler to conduct the cooling (or stages of cooling as described above). In other variations, the crystallization unit may have a crystallization vessel equipped with a cooling jacket or other cooling mechanism. The at least one cooler may circulate a heat exchange medium, such as a heat exchange fluid, like liquid water or air, to cool the incoming concentrated liquid stream to a predetermined temperature prior to entering the crystallizer vessel. The cooler may have a heat exchange design like those described above in the context of the heat exchangers for heating the liquid stream or may include a thermoelectric cooler or other design known to those of skill in the art. In this manner, the sodium sulfate ($Na_2SO_4$) may be removed from the effluent stream as sodium sulfate ($Na_2SO_4$) solids in the crystallizer vessel, which have reduced solubility in water at these predetermined temperatures, as compared to lithium sulfate ($Li_2SO_4$) that remains in solution. As will be appreciated by those of skill in the art, crystallization and precipitation are similar solidification processes. While not being bound by any particular theory, it is believed that sodium sulfate ($Na_2SO_4$) may solidify via a crystallization process, for example, through a physical change in conditions, such as a decrease in temperature or pressure that occurs in the processes and systems according to certain aspects of the present disclosure. In such a crystallization process, a dissolved substance (e.g., $Na_2SO_4$) can form a solid structure that may be crystalline, for example, having a regular, repeating pattern of atoms or molecules. The crystal formation may occur slowly where the crystals can grow and appear as a solid mass. Thus, the sodium sulfate ($Na_2SO_4$) solids may comprise crystalline sodium sulfate ($Na_2SO_4$). In other aspects, the solidification process may involve a process more conventionally understood to be precipitation process, for example, where sedimentation of a solid material (e.g., $Na_2SO_4$ as a precipitate) from a liquid solution occurs where the material is present in amounts greater than its solubility in the liquid (e.g., cooled liquid). The solid product (e.g., $Na_2SO_4$) generated by such a process may not be fully crystalline. Regardless of the mechanism, the solidification process contemplated by the present disclosure removes a solid phase of sodium sulfate ($Na_2SO_4$) from the liquid effluent stream.

In certain aspects, a purity of the sodium sulfate ($Na_2SO_4$) byproduct is greater than or equal to about 95% by weight to less. For example, the sodium sulfate byproduct collected after separating may constitute greater than or equal to about 95% by weight on a dry basis of a total weight of the material collected to less than or equal to about 99% by weight of a total weight of byproduct collected. In certain variations, greater than or equal to about 60% by weight to less than or equal to about 80% by weight of an initial amount of sodium sulfate ($Na_2SO_4$) is removed from the effluent stream. Thus, in certain variations, greater than or equal to about 50 g/L to less than or equal to about 80 g/L sodium sulfate ($Na_2SO_4$) may remain in the effluent stream after the separating.

In the crystallizer vessel, sodium sulfate ($Na_2SO_4$) is a solid that may be separated from the concentrated liquid effluent stream. In certain variations, a mother liquor and a supernatant stream may be generated within the crystallizer vessel or downstream separation unit, so that the mother liquor comprises the sodium sulfate ($Na_2SO_4$) and a portion of water. In certain aspects, the supernatant (second effluent stream) comprises the lithium sulfate ($Li_2SO_4$), a reduced concentration of sodium sulfate ($Na_2SO_4$), and a portion of the water. The crystallizer unit may include additional separations equipment, such as a centrifuge and/or filter to separate the solid sodium sulfate ($Na_2SO_4$), which may be beneficially reused as a byproduct in certain variations. Thus, in certain variations, the processes contemplate removing the sodium sulfate ($Na_2SO_4$) solids from the effluent stream (second effluent stream and/or mother liquor), which may occur by centrifuging a byproduct stream comprising the sodium sulfate ($Na_2SO_4$) solids to separate liquids and collect the sodium sulfate ($Na_2SO_4$) solids. In certain variations, the liquid (e.g., water) separated from the sodium sulfate ($Na_2SO_4$) solids or otherwise collected from the crystallizer vessel may be recycled to different parts of the system. For example, the separated liquid (e.g., water) may be first used in the cooling system for the effluent liquid stream prior to entering the crystallizer vessel and then used in the lithium recovery unit downstream. It is also contemplated herein that the separated liquid (e.g., water) optionally may be combined with the second effluent stream (supernatant) generated in the crystallizer vessel and this combined stream may be sent to the lithium recovery unit downstream. Alternatively, the separated liquid (e.g., water) may be sent the lithium recovery unit downstream without combining it with the second effluent stream.

In alternative embodiments, the solidifying sodium sulfate ($Na_2SO_4$) solids from the liquid stream includes cooling the liquid stream and solidifying sodium sulfate ($Na_2SO_4$) from the cooled liquid stream in a crystallizer vessel as described herein to generate a third effluent stream. For example, the cooling the liquid stream is to a temperature of less than or equal to about 20° C., optionally less than or equal to about 10° C., optionally less than or equal to about 5° C., optionally less than or equal to about 3° C., optionally less than or equal to about 0° C., optionally less than or equal to about −2° C., and in certain variations, optionally less than or equal to about −5° C. The cooling of the liquid stream may occur in multiple cooling stages as described herein. The cooled concentrated liquid effluent may then pass into a downstream crystallizer unit that receives the liquid stream where solid sodium sulfate ($Na_2SO_4$) is generated as described above. As described above, the crystallizer unit comprises a crystallizer reactor or vessel as described herein and at least one upstream cooler as described herein to conduct the cooling (or stages of cooling as described above). In other variations, the crystallization unit may have a crystallization vessel equipped with a cooling jacket or other cooling mechanism. The solid sodium sulfate ($Na_2SO_4$) may be separated or removed from the third effluent and/or mother liquor as described above. Additionally or alternatively, the liquid (e.g., water) separated from the sodium sulfate ($Na_2SO_4$) solids optionally may be combined with the third effluent stream (supernatant) generated in the crystallizer vessel and this combined stream may be sent to an evaporator downstream. Alternatively, the separated liquid (e.g., water) may be sent to an evaporator without combining it with the third effluent stream. In any embodiment, the cooling the liquid stream may include exchanging heat with the third effluent generated in the crystallizer vessel in the at least one cooler, e.g., a heat exchanger. It is contemplated herein that variations where the cooling of the liquid stream occurs prior to other processes like concentrating via evaporation may be performed for any concentration of lithium present in the liquid stream but may be particularly advantageous when a lower concentration of lithium is present in light of the difficulty of recovering lithium due to the solubility products of both sodium and lithium salts being very close.

The liquid stream having the solubilized lithium sulfate ($Li_2SO_4$) (third effluent) can then be passed to an evaporator/evaporator system as described herein evaporating a portion of water in the third effluent stream to generate water vapor and a fourth effluent stream having solubilized lithium sulfate ($Li_2SO_4$) concentrated therein. Additionally or alternatively, the third effluent may be heated prior to evaporating/entering the evaporator/evaporator system, for example, to a temperature of greater than or equal to about 90° C. For example, the heating the third effluent stream may include exchanging heat with the liquid stream in the at least one cooler, e.g., a heat exchanger, or the third effluent stream may be heated in a preheater as described above. Additionally or alternatively, a portion of the fourth effluent stream may serve as a reflux stream and be combined with the liquid stream prior to entering the crystallizer.

The concentrated liquid stream having the solubilized lithium sulfate ($Li_2SO_4$) (the second effluent stream or the fourth effluent stream) then passes from the crystallizer unit or the evaporator into a downstream lithium recovery unit. The lithium recovery unit may comprise a reactor, a heat source, and a liquid-solid separator component, such as a filtration unit comprising a filter or a centrifuge.

The process also comprises heating the effluent stream (the second effluent stream or the fourth effluent stream) and introducing sodium carbonate ($Na_2CO_3$) to produce lithium carbonate ($Li_2CO_3$) product. In certain variations, the heating of the effluent stream is to a temperature of greater than or equal to about 80° C. to less than about 100° C., optionally greater than or equal to about 80° C. to less than or equal to about 90° C. The temperature of the effluent stream is maintained during the introducing of sodium carbonate ($Na_2CO_3$) and through the mixing and reaction in the reactor.

By way of example, the process for precipitating lithium carbonate ($Li_2CO_3$) from lithium sulfate ($Li_2SO_4$) solution described herein may generally illustrate certain conditions according to the present teachings. In the precipitation of lithium carbonate ($Li_2CO_3$), a reaction occurs in solution between lithium sulfate ($Li_2SO_4$) and soda ash ($Na_2CO_3$), which facilitates forming a dense precipitate, with good settling, filtering, and washing properties to form a wet cake of low moisture content. The chemical reaction, in aqueous solution, that is believed to occur is as follows:

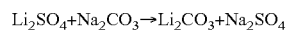

$$Li_2SO_4 + Na_2CO_3 \rightarrow Li_2CO_3 + Na_2SO_4$$

In certain aspects, because lithium carbonate ($Li_2CO_3$) has an appreciable solubility, especially in the mother liquor/liquid effluent stream, it is desirable to provide concentrated solutions in order to minimize the volume of mother liquor/liquid stream being processed. The solubility of lithium carbonate ($Li_2CO_3$) in water or in salt solutions decreases with an increase in temperature. Therefore, to minimize solubility loss, it is advantageous to carry out the lithium precipitation, especially centrifuging, at an elevated temperature, for example, a temperature at greater than or equal to about 80° C. to less than or equal to about 100° C. at ambient pressure conditions (e.g., 1 atm.)

In certain aspects, a stoichiometric excess of sodium carbonate ($Na_2CO_3$) is introduced. As such, in certain variations, the process further includes the introducing of sodium carbonate ($Na_2CO_3$) at a stoichiometric excess of greater than or equal to about 10% to less than or equal to about 15%. For example, in certain variations, approximately 10% to about 15% of a stoichiometric excess of $Na_2CO_3$ over that equivalent to the $Li_2SO_4$ is desirable, because the increased carbonate ion concentration may lower the solubility of $Li_2CO_3$ in the mother liquor/liquid stream. It is calculated that, under these conditions, approximately 15% of the lithium present in the starting $Li_2SO_4$ solution remains unprecipitated in the mother liquor/liquid stream as soluble $Li_2CO_3$. While this soluble lithium may be recovered almost completely by precipitation as fluoride, phosphate, or silicate, none of these recovery procedures is economical for various reasons.

In certain variations, a temperature in the lithium precipitation reactor may be greater than or equal to about 50° C. to less than or equal to about 70° C., a residence time in the reactor may be greater than or equal to about 1 hour to less than or equal to about 2 hours, and flow rates will depend upon a batch size being processed (and the residence time above).

Thus, the present methods and systems enable higher levels of recovery of lithium as lithium carbonate ($Li_2CO_3$) by (i) (a) first concentrating the lithium sulfate ($Li_2SO_4$) in the liquid stream via evaporation, followed by solidifying sodium sulfate ($Na_2SO_4$) in a crystallizer unit or (b) first solidifying sodium sulfate ($Na_2SO_4$) in a crystallizer unit, followed by concentrating the lithium sulfate ($Li_2SO_4$) in the liquid stream via evaporation, and (ii) then processing the remaining lithium sulfate ($Li_2SO_4$) as described above to maximize recovery of the lithium carbonate ($Li_2CO_3$) as beneficially reusable product.

Finally, the process comprises separating lithium carbonate ($Li_2CO_3$) product from the effluent stream. The reactor receives the concentrated liquid stream (the second effluent stream or the fourth effluent stream) from the crystallizer unit or the evaporator, along with a source of sodium carbonate ($Na_2CO_3$). In this manner, a reaction occurs in the reactor to form a product stream comprising lithium carbonate ($Li_2CO_3$). The lithium carbonate ($Li_2CO_3$) may be separated from the remaining liquid stream (lithium carbonate ($Li_2CO_3$) product stream) via a filtration unit or other liquid-solid separation unit. In this manner, a product stream is generated and then passes through the filter and is separated into a retentate comprising lithium carbonate ($Li_2CO_3$) product and a waste stream. In certain aspects, the lithium carbonate ($Li_2CO_3$) product has a purity level of greater than or equal to about 80% by weight. For example, the lithium carbonate product collected after separating it from the effluent stream and drying with water removed may constitute greater than or equal to about 80% by weight on a dry basis of a total weight of the material collected. In certain variations, a purity of the lithium carbonate ($Li_2CO_3$) product may be greater than or equal to about 80% to less than or equal to about 90% by weight of a total weight of product collected.

In accordance with various aspects of the present disclosure, lithium carbonate ($Li_2CO_3$) is thus recovered as a recycled product from a lithium-ion battery waste stream and capable of beneficial reuse. Further, in certain aspects, sodium sulfate ($Na_2SO_4$) may also be recovered as byproduct, respectively. The recovered sodium sulfate can be used as a recycled product in various industries, such as the detergent industry.

In various aspects, the recovery of lithium as a recycled product from a lithium-ion battery waste stream as feed material may occur in a system with batch or continuous processing or combinations thereof, where the material streams undergo successive reactions. The various stages or units are arranged consecutively providing intermediate processed streams to the next stage units. Such stages may include, for example, an evaporation stage or unit that may include a heating system, a crystallization stage or unit that includes a cooling system, and a lithium recovery stage or unit, as further explained below. Certain streams from a given recovery stage or unit may be used to exchange heat with other streams being processed to increase energy efficiency of the system as heating or cooling processes are conducted. While not limiting, in one example where 500 kg of black mass waste stream is processed, the methods and systems may process materials at a flow rate of about 1,000 kg/hr. or 1 $m^3$/hr. However, as will be appreciated by those of skill in the art, the flow rates are dependent on a total volume being processed and thus may be varied as appropriate.

Figure 1:
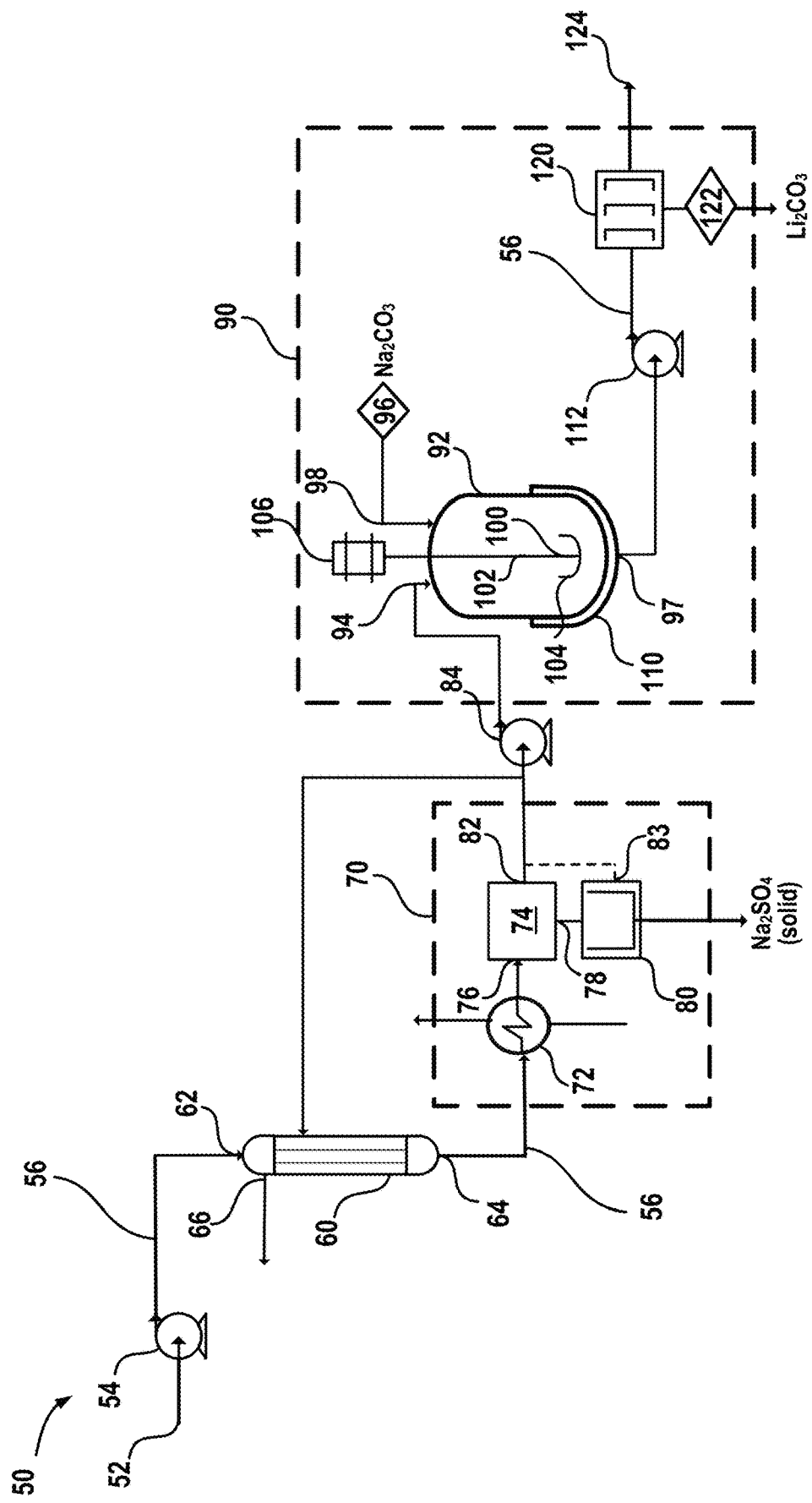
FIG. 1 shows a system for recovering lithium from a waste stream derived from a lithium-ion battery according to certain variations of the present disclosure.

FIG. 1 is one example of a lithium recycling plant or system 50 according to certain aspects of the present disclosure for recovering lithium from a lithium-ion battery waste stream, which may be used to carry out various aspects of the processes described above. A liquid stream 52 comprising lithium sulfate ($Li_2SO_4$), sodium sulfate ($Na_2SO_4$), and water ($H_2O$) is pumped via a pump 54 in a fluid conduit 56 that establishes fluid communication between the various components in the system 50. Any one of the pumps disclosed herein may include any suitable type of pump. For example, the pumps may be centrifugal pumps, positive-displacement pumps, axial-flow pumps, and the like. The liquid stream 52 enters a gas-liquid separator, such as an evaporator 60, via an inlet 62. The evaporator 60 has a first outlet 64 and a second outlet 66. While not shown in FIG. 1, the liquid stream 52 may be heated as it enters the evaporator 60. In the evaporator 60, at least a portion of the water from the liquid stream 52 is volatilized or evaporated to generate a concentrated liquid or effluent stream and a stream of water vapor or steam. The concentrated liquid stream passes through the first outlet 64 and water vapor passes out of the evaporator 60 through the second outlet 66.

Next, the concentrated liquid effluent stream passes into a crystallizer unit 70 downstream of the evaporator 60. The crystallizer unit 70 may include one or more coolers (generally shown at 72) that receive and cool the concentrated liquid stream, for example, as a heat exchanger. After passing through the cooler(s) 72, the concentrated liquid stream enters a crystallizer reactor or vessel 74 via an inlet 76. In the crystallizer vessel 74, the cooled concentrated liquid stream has a predetermined temperature that facilitates formation of sodium sulfate ($Na_2SO_4$) solids as described above. The solid sodium sulfate (and optionally mother liquor and/or supernatant) may be removed via a first outlet 78 and passed through a liquid-solid separator device 80. It should be noted, that while not shown in FIG. 1, but as will be appreciated by those of skill in the art, the system may further include a mother liquor storage vessel/tank (and a supernatant storage vessel/tank) in fluid communication with either the liquid-solid separator device 80 and/or crystallizer reactor or vessel 74. As shown in FIG. 1, the solid-liquid separator device 80 may be a centrifuge that separates the sodium sulfate ($Na_2SO_4$) solids from the supernatant comprising the concentrated lithium-containing product (e.g., lithium sulfate ($Li_2SO_4$)) and/or mother liquor. In one variation, Table 2 below outlines suitable conditions for the crystallization unit 70, including in the crystallization vessel 74.

TABLE 2

| | |
|---|---|
| Crystallizer/Thickener/Cooling Vessel | Volume: 500 L<br>Material of construction: carbon steel/enamel coating<br>Power: 1.5 kW |
| Liquid-solid separator device (Decanter) | Horizontal centrifuge system<br>Production capacity: 90 Kg/h<br>N: 7.5 KW<br>Material of construction: SS316L |
| Mother Solution Tank | Volume: 500 L<br>Material of construction: SS316L<br>Power: 1.5 kW |
| Mother Solution Pump | Q = 1 m3/h, Head = 30 m<br>Material of construction: SS316L<br>Power: 1.5 KW |

The concentrated liquid effluent stream (e.g., supernatant) (second effluent stream) having the solubilized lithium sulfate ($Li_2SO_4$) in the crystallizer vessel 74 of the crystallizer unit 70 may then be removed via a second outlet 82 where it passes to a downstream lithium recovery unit 90. Optionally, liquid (e.g., water) separated from the sodium sulfate ($Na_2SO_4$) solids may be removed via a third outlet 83 and optionally combined with the second effluent stream and this combined stream then passes to the downstream lithium recovery unit 90. Alternatively, the separated liquid (e.g., water) may be removed via the third outlet 83 and sent to the downstream lithium recovery unit 90 without combining it with the second effluent stream. The lithium recovery unit 90 may comprise (i) a reactor 92, a heat source 110 (e.g., heat jacket, which may be heated with steam or other heaters known in the art), and a solid-liquid separator, such as a filtration unit 120 comprising one or more filters downstream of the reactor 92. Notably, the solid-liquid separator may be a centrifuge or other solid-liquid separation unit known to those of skill in the art. The reactor 92 receives the concentrated liquid stream from the crystallizer unit 70 via inlet 94. A source of sodium carbonate ($Na_2CO_3$) 96 is in communication with a second inlet 98 to the reactor 92 for delivering sodium carbonate ($Na_2CO_3$) thereto. The reactor 92 also includes an agitator 100.

Thus, the reactor 92 receives both the concentrated liquid effluent stream (second effluent) and sodium carbonate ($Na_2CO_3$). The concentrated liquid stream and the sodium carbonate may be introduced into the reactor 92 concurrently or in different phases. In certain variations, the recovery of lithium carbonate ($Li_2CO_3$) from the solution is performed by first heating the solution containing the lithium sulfate ($Li_2SO_4$) in the reactor 92 via heat source 110 to a temperature of greater than or equal to about 80° C. to less than or equal to about 90° C. The temperature may be maintained through the process. Sodium carbonate ($Na_2CO_3$) may be added to the heated solution in the reactor 92, which may then cause solid lithium carbonate ($Li_2CO_3$) to precipitate.

An agitator 100 extending into the reactor 92 may mix the contents as explained herein. In various embodiments, any one of the agitators 100 disclosed herein may include a shaft 102 extending into reactor 92, one or more impellers 104 attached to the shaft 102, and a motor 106 for rotating the shaft 102 and the impellers 104. In some embodiments, each impeller 104 may include one or more blades (or fins) for stirring contents in the reactor. For example, one agitator may include two impellers separated by a defined distance, with each impeller having three blades. Notably, agitators 100 may include other forms of mixers or agitators (e.g., sonication, bubblers, and the like) for the reactor as well.

The reactor 92 may be agitated with the agitator 100 for a defined period of time, for example, greater than or equal to about 30 minutes to less than or equal to about 45 minutes, and the temperature may be maintained at the desired temperature with the heat source 110. After the agitation period is complete, the lithium sulfate ($Li_2SO_4$) will precipitate as lithium carbonate ($Li_2CO_3$), shown in the example formulation above.

The lithium recovery unit 90 may further include a second pump 112 that pumps the concentrated liquid stream containing lithium carbonate ($Li_2CO_3$) exiting the reactor 92 into a filtration unit 120 including one or more filters. The filtration unit 120 is in fluid communication with the outlet 97 of the reactor 92. The liquid effluent stream passes through the one or more filters in the filtration unit 120, which are separated into a retentate comprising the recycled lithium carbonate ($Li_2CO_3$) solid product that may be stored as a cake or solid in a storage vessel 122 and a liquid waste stream 124 comprising water and other impurities that exits the filtration unit. The impurities passing through the filtration unit 120 may be processed as desired, for example, may be sent to wastewater treatment and/or recycled back to the reactor.

In various embodiments, any one of the filters disclosed herein may include any suitable type of filter. For example, the filters may be pressure (or press) filters, hydraulic filters, gravity filters, and the like.

Accordingly, the present disclosure contemplates a system in which the methods are used to recover lithium carbonate. The present technology provides new methods for recovering lithium carbonate ($Li_2CO_3$) from lithium-ion batteries, further reducing the current challenges with discharging lithium and sodium sulfate to the environment as a waste product, while providing the market with economically attractive lithium carbonate ($Li_2CO_3$) as a recycled product having good purity levels.

FIG. 2 shows a partial view of a lithium recycling plant or system for recovering lithium from a lithium-ion battery waste stream like that shown in FIG. 1, but further including a heating system integrated as part of the evaporator system. As shown in FIG. 2, an alternative variation of a system 150 includes a heating system 152 that processes the liquid stream 52 prior to entering the evaporator 60 according to certain variations of the present disclosure. To the extent that the components are the same as those shown in FIG. 1, for brevity, the same reference numbers will be used and the components will not be introduced or discussed again herein, unless salient features or functions are pertinent to the variation shown in FIG. 2. In FIG. 2, the liquid stream 52 may enter the heating system 152 that includes a preheater 160. The liquid stream 52 may enter at a first inlet 162 and exit via a first outlet 164. The preheater 160 serves to heat the liquid stream 52 to a first predetermined temperature. As was described above, the preheater 160 may be a heater or may also include a heat exchanger as shown, which may further permit another fluid stream to pass therethrough for heat exchange with the liquid stream 52. In this variation, the preheater 160 thus also includes a second inlet 166 and a second outlet 168 through which a distinct heat exchange fluid stream flows to exchange heat with the liquid stream.

The liquid stream 52 then enters a heat exchanger 180 at a first inlet 182 and exit via a first outlet 184. The heat exchanger 180 serves to heat the liquid stream 52 to a second predetermined temperature. As will be described further below, the heat exchanger 180 furthers permit another fluid stream to pass therethrough for heat exchange with the liquid stream 52. In this variation, the heat exchanger 180 thus includes a second inlet 186 and a second outlet 188 through which a distinct heat exchange fluid stream flows. More specifically, the second inlet 186 receives a compressed steam stream that exits the evaporator 60 at second outlet 66 and then passes into a compressor 190 where the steam is compressed to increase pressure and temperature. The compressor 190 may be a variety of different compressors known in the art, including centrifugal, reciprocating, rotary (rotary vane, rolling piston, single screw, twin screw), and orbital (scroll or trochoidal) compressors. The compressed steam exits the compressor 190 and enters into the second inlet 186 of the heat exchanger 180 and exits via the second outlet 188.

In one variation, Table 3 below outlines suitable conditions for the heating system 152.

TABLE 3

| | |
|---|---|
| Steam Compressor | Flow Rate: 0.83 t/h, Inlet temp: 90° C., Outlet temp: 100° C., Power: 75 KW, Impeller Material of construction (MOC): 2205, Volute MOC: SS316L, Equipped with variable frequency drive (VFD) |
| Compressor Condensate Tank | Volume: ($\varphi$) 400 × 500 mm MOC: SS316L |
| MVR Condensate Tank | Volume: ($\varphi$) 1000 × 1200 mm MOC: SS316L |
| Condensate Pump | Flow rate (Q) = 1 m³/h, Head = 30 m MOC: SS 316L Power: 1.5 KW |

In certain variations, the compressed stream may be reinjected into fluid conduit 56 downstream of the preheater 160 and upstream of the evaporator 60, which blends with the incoming liquid stream 52 to increase its temperature and pressure, which makes the evaporation more efficient. For example, approximately 83 to 85% of steam may be recycled and a temperature may be raised to greater than or equal to about 92° C. to less than or equal to about 110° C., which may increase an efficiency of the system.

Next, the stream comprising water exiting the heat exchanger 180 may have at least partially condensed from steam (therefore now includes condensate of water) and enters the second inlet 166 of the preheater 160 and passes through to the second outlet 168, where it exchanges heat with the passing liquid stream 52. In this manner, the heat exchanger 180 may serve as a condenser for the second stream. After being processed in the evaporator 60, the concentrated liquid effluent stream may then be directed to the crystallizer unit 70 for processing as previously described above.

Figure 3:
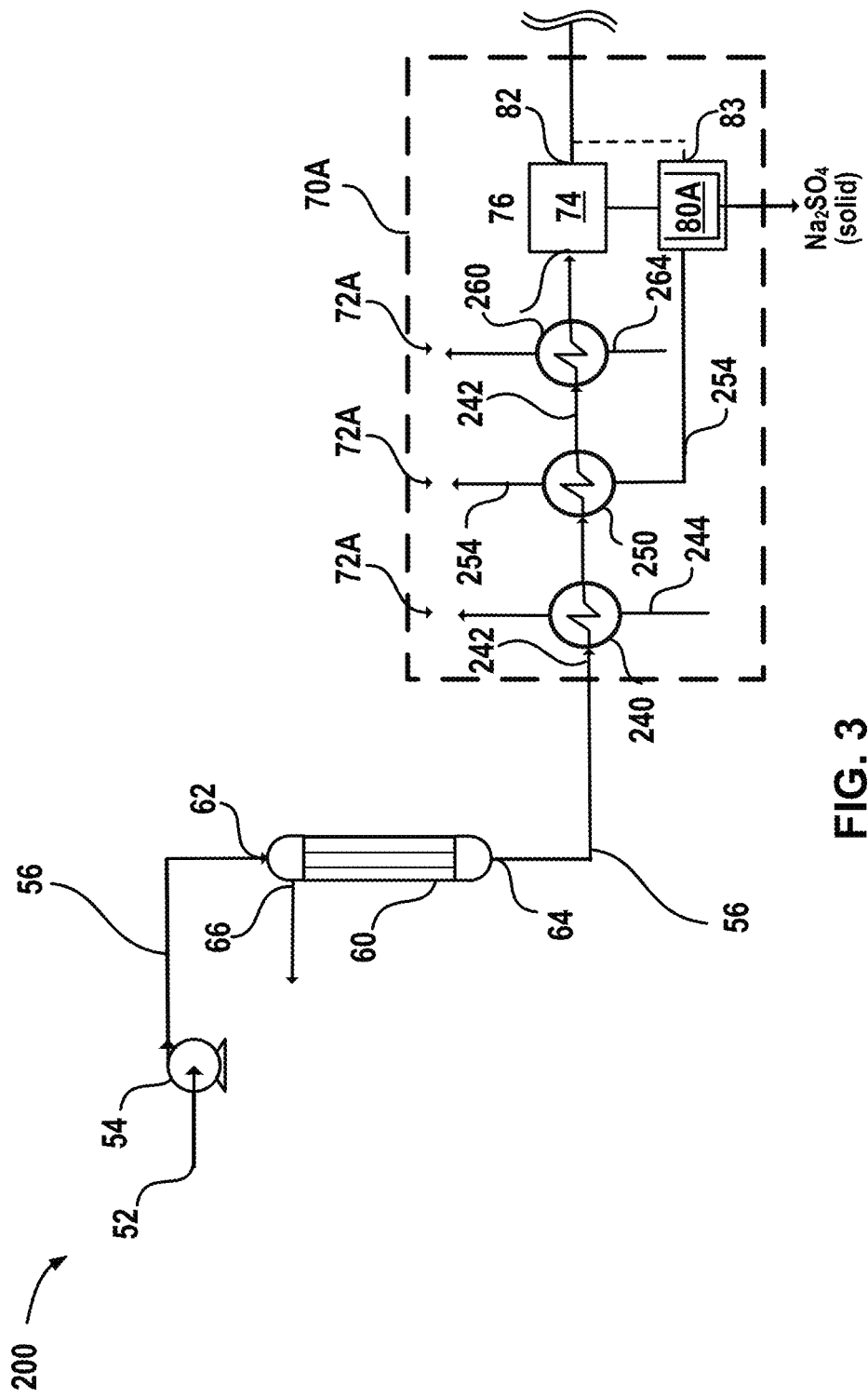
FIG. 3 shows a partial view of a system for recovering lithium according to certain alternative variations of the present disclosure, including a multi-stage cooler system upstream of a crystallizer vessel in a crystallization unit.

FIG. 3 shows a partial view of a lithium recycling plant or system 200 for recovering lithium from a lithium-ion battery waste stream like system 50 shown in FIG. 1, but further including plurality of coolers as part of a crystallizer unit 70A according to certain variations of the present disclosure. To the extent that the components are the same as those shown in FIGS. 1 and 2, for brevity, the same reference numbers will be used and the components will not be introduced or discussed again herein, unless salient features or functions are pertinent to the variation shown in FIG. 3.

FIG. 3 shows another variation of a system 200 that includes heating for the liquid stream 52 prior to the evaporator 60 and a plurality of coolers 72A included in a crystallizer unit 70A according to certain variations of the present disclosure. To the extent that the components are the same as those shown in FIGS. 1 and 2, for brevity, the same reference numbers will be used and the components will not be introduced or discussed again herein unless salient features or functions are pertinent to the variation shown in FIG. 3.

The liquid stream 52 enters the evaporator 60 where the concentrated liquid effluent stream exits the first outlet 64 and passes to the crystallizer unit 70A that includes a plurality of coolers 72A. Notably, the crystallizer unit 70A may only comprise one cooler, but as shown has a plurality of distinct coolers 72A or cooling heat exchangers. As shown, a first cooler 240 receives a concentrated liquid stream 242 that passes through the first cooler 240 in a first direction. A first stream 244 of cooling heat exchange medium passes through the first cooler 240 in a heat exchange relationship with the concentrated liquid stream 242 in a second direction. The second direction may be concurrent, countercurrent, or cross-exchange with respect to the first direction. The heat exchanger may have any of the designs described above in the context of the heat exchanger 180 in FIG. 2. In one example, the cooling heat exchange medium may be water in the first cooler 240. The first cooler 240 may achieve the first cooling stage described above in the context of processes provided by certain aspects of the present disclosure.

A second cooler 250 is downstream of the first cooler 240 and receives the concentrated liquid stream 242 that passes through the second cooler 250 in a first direction. A second stream 254 of cooling heat exchange medium passes through the second cooler 250 in a heat exchange relationship with the concentrated liquid stream 242. The second stream 254 may be a stream that is generated from the crystallizer reactor 74, for example, a liquid stream diverted from a portion of the supernatant stream. The second direction of the fluid flow in the second cooler 250 may be concurrent, countercurrent, or cross-exchange with respect to the first direction. The second cooler 250 may achieve the second cooling stage described above in the context of processes provided by certain aspects of the present disclosure.

A third cooler 260 is downstream of the second cooler 250 and receives the concentrated liquid stream 242 and further cools it. In certain variations, a flow rate through the third cooler 260 may be 1 m³/hr. and have a temperature of about 92° C. A third stream 264 of cooling heat exchange medium passes through the third cooler 260 in a heat exchange relationship with the concentrated liquid stream 242 in a second direction. The second direction may be concurrent, countercurrent, or cross-exchange with respect to the first direction. In one example, the cooling heat exchange medium may be water in the third cooler 260. The third cooler 260 may achieve the third cooling stage described above in the context of processes provided by certain aspects of the present disclosure.

In the crystallizer unit 70A, a centrifuge 80A is included to enhance separation of the sodium sulfate ($Na_2SO_4$) solids from the mother liquor/liquid stream in the crystallizing vessel 74. The liquid stream may then be recycled, for example, passed into the cooler system (e.g., into the second cooler 250 as described above) as the second stream 254. The effluent stream having the sodium sulfate ($Na_2SO_4$) removed (the second effluent stream) may then pass out of outlet 82 of the crystallizing vessel 74 and enter into the lithium recovery unit (not shown in FIG. 3, but as shown as lithium recovery unit 90 in FIG. 1).

FIG. 3 shows another variation of a system 200 that includes heating for the liquid stream 52 prior to the evaporator 60 and a plurality of coolers 72A included in a crystallizer unit 70A according to certain variations of the present disclosure. To the extent that the components are the same as those shown in FIGS. 1 and 2, for brevity, the same reference numbers will be used and the components will not be introduced or discussed again herein unless salient features or functions are pertinent to the variation shown in FIG. 3.

The liquid stream 52 is pumped via pump 54 and enters the evaporator 60 where the concentrated liquid stream exits the first outlet 64 and the steam stream exits the second outlet 66. The concentrated liquid stream exiting the first outlet 64 next passes to the crystallizer unit 70A that includes at least one cooler 72A. Notably, the crystallizer unit 70A may only comprise one cooler, but as shown has a plurality of distinct cooling heat exchangers. As shown, the first cooler 240 receives a concentrated liquid stream 242 that passes through the first cooler 240 in a first direction. The first stream 244 of cooling heat exchange medium passes through the first cooler 240 in a heat exchange relationship with the concentrated liquid stream 242 in a second direction. The second direction may be concurrent, countercurrent, or cross-exchange with respect to the first direction. In one example, the cooling heat exchange medium may be water in the first cooler 240.

The second cooler 250 is downstream of the first cooler 240 and receives the concentrated liquid stream 242 that passes through the second cooler 250 in a first direction. The second stream 254 of cooling heat exchange medium passes through the second cooler 250 in a heat exchange relationship with the concentrated liquid stream 242. The second stream 254 may be a stream that is generated from the crystallizer reactor 74, for example, a liquid stream diverted from a portion of the supernatant stream. The second direction of the fluid flow in the second cooler 250 may be concurrent, countercurrent, or cross-exchange with respect to the first direction.

The third cooler 260 is downstream of the second cooler 250 and receives the concentrated liquid stream 242 and further cools it. The third stream 264 of cooling heat exchange medium passes through the third cooler 260 in a heat exchange relationship with the concentrated liquid stream 242 in a second direction. The second direction may be concurrent, countercurrent, or cross-exchange with respect to the first direction. In one example, the cooling heat exchange medium may be water in the third cooler 260.

In the crystallizer unit 70A, a centrifuge 80A is included to enhance separation of the sodium sulfate ($Na_2SO_4$) solids from the mother liquor/liquid stream in the crystallizing vessel 74. The liquid stream may then be passed into the cooler system (e.g., into the second cooler 250 as described above). As noted above, while not shown, the crystallizer unit 70A may include one or more tanks for storing mother liquor, supernatant, and the like.

In this manner, the liquid stream 52 may be preheated by a preheater (e.g., preheater 160 in FIG. 2). In certain variations, like in FIG. 2, the heating source of the preheater 160 is the system's secondary steam condensate. Due to the complexity of the liquid stream 52, in order to avoid potential shutdown caused by scaling and enhance the stability of the system, the feed flow rate may be automatically adjusted. While not shown, in certain variations, a vapor-liquid separator may be disposed downstream of the evaporator to receive a concentrated liquid stream and the steam stream where it further separates the vapor and liquid. The separator generates a concentrated liquid stream and a vapor/steam stream. In certain aspects, a separator liquid level is maintained at a predetermined point.

In certain aspects, the evaporation system adopts a forced circulation process by including a compressor and may include a forced circulation pump, for example, pump 84 in FIG. 1, in order to ensure the high-speed flow of the material in the tubes of the heat exchanger(s), and to help prevent the material from scaling and potentially blocking the heat exchanger tubes. In certain aspects, the characteristics of the forced circulation process are as follows. First, a forced circulation evaporator is used to avoid boiling on the heating surface to form fouling or crystallization. Second, the circulation of the evaporated liquid in the equipment mainly relies on the forced flow of the circulating pump. Further, the material does not evaporate in the heater, for example, in the preheater 160 in FIG. 1 and the concentration will not change in the heat exchanger. The concentration will increase after flashing in the separating crystallizer, so it will not adhere to the heat exchange surface and cause fouling on the heat exchange surface. Finally, a main body of the separation crystallizer has a sufficient liquid/gas separation area and separation height, which can ensure long-term evaporation and stable discharge concentration. In one variation, Table 4 below outlines suitable conditions for a heater system 152 like that shown in FIG. 1.

TABLE 4

| Pre-Heater | Tube Shell Type Heat Exchanger<br>Heating Surface Area: 5 $m^2$ |
|---|---|
| Main Evaporator | Tube Shell Type Evaporator/Heat Exchanger<br>Heating Surface Area: 60 $m^2$<br>Tube Size: $\Phi$ 38 × 1.2 × 2500 mm<br>Tube: material of construction: (MOC): 2205<br>Shell MOC: SS316L |
| Separator | Size: $\Phi$ 1000 mm × 2000 mm<br>Equipped with Demister and washing device |

Figure 4:
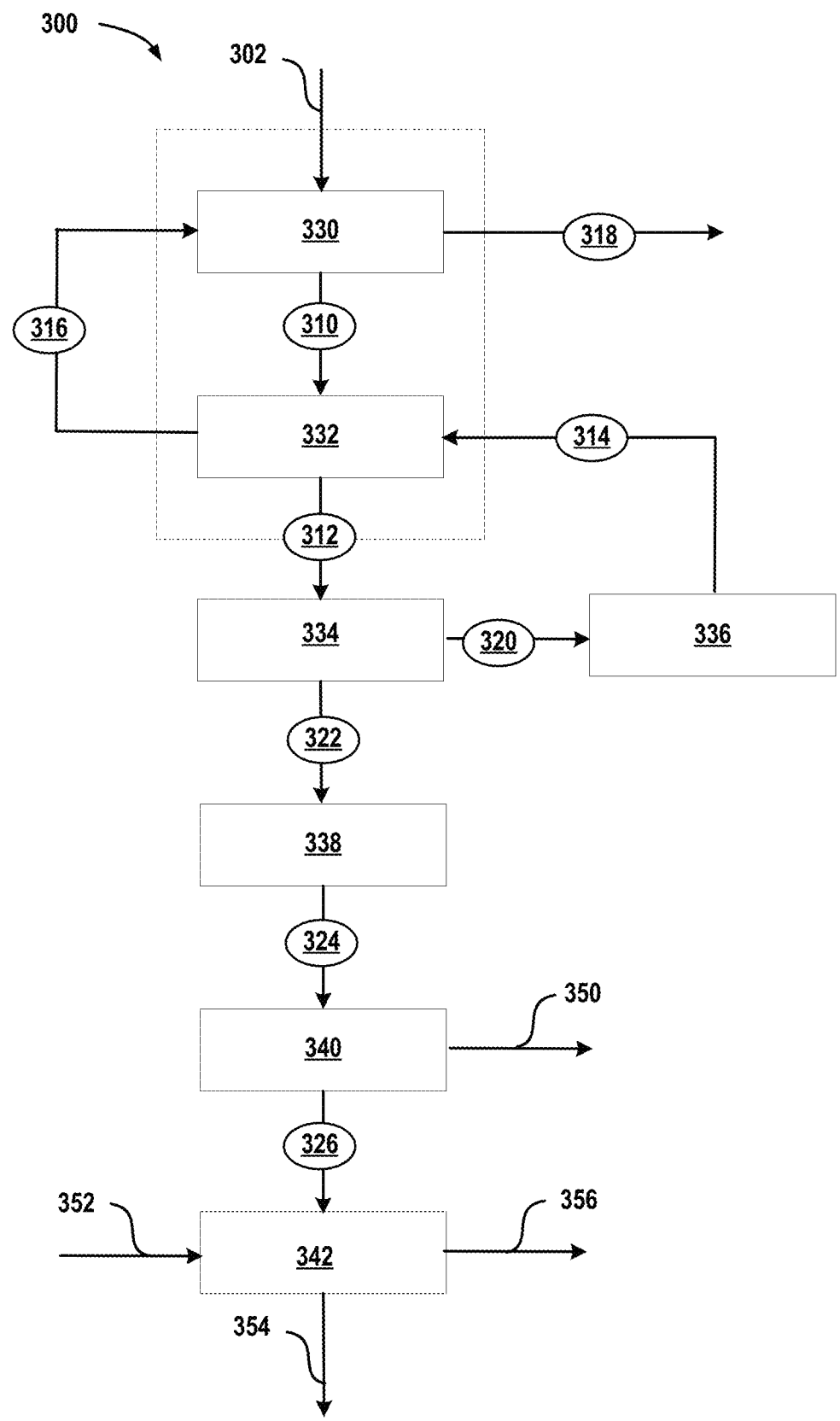
FIG. 4 shows an example of a process for recovering lithium according to certain variations of the present disclosure.

FIG. 4 shows a non-limiting example of a process 300 for recovering lithium according to certain variations of the present disclosure conducted in a system similar to that described in the context of FIGS. 1 and 2. In the process 300, a liquid waste stream 302 is introduced into a preheater at 330. The liquid waste stream 302 may have a solids content of approximately greater than or equal to about 13% to less than or equal to about 17%, a temperature of about 60° C., and may be introduced into the system at a flow rate of about 1,000 kg/hr. After exiting the preheater 330, the liquid waste stream 302 has a temperature of about 80° C. at the point designated 310. Next, the liquid waste stream 302 passes into a heat exchanger 332, where its temperature is increased to about 92° C. at the point designated 312. The heat exchanger 332 also receives a compressed steam stream at a temperature of about 110° C. at point 314. After passing through the heat exchanger 332, the steam may undergo an exothermic phase change and be condensed to liquid water and have a temperature at point 316 of about 110° C. This condensed water stream may then enter the preheater 330 to further exchange heat with the incoming liquid waste stream 302. At point 318, the cooled condensate may have a temperature of about 50° C.

Next, the liquid waste stream 302 passes into a separator/evaporator 334, where a portion of the water is removed to form a water vapor/steam stream and a concentrated liquid stream having the lithium sulfate and sodium sulfate, as described above. The steam stream leaving the evaporator 334 at point 320 may have a temperature of about 92° C. and may be processed in a compressor 336. After the steam is compressed and heated, it will have the conditions described above at point 314 and then enters the heat exchanger 332.

After exiting the evaporator 334, the liquid waste stream 302 has a temperature of about 92° C. at point 322 and next passes into a cooling unit 338.

After being cooled in the cooling unit 338, the liquid waste stream 302 has a temperature of greater than or equal to about 3° C. to less than or equal to about 20° C. at point 324. After passing through a crystallization unit 340, which may include a liquid-solid separator and reactor vessel (such as a decanter), a byproduct stream 350 comprising sodium sulfate salts solidified in the crystallization unit 340 is removed.

As the liquid waste stream 302 exits the crystallization unit 340, it may have a temperature at point 326 of about 20° C. Finally, the liquid waste stream 302 enters the lithium recovery process 342. A stream 352 of sodium carbonate ($Na_2CO_3$) is added during the lithium recovery process 342. A lithium carbonate ($Li_2CO_3$) product 354 is then generated, which may have a purity level of approximately 80-90%. A waste stream 356 of residue solution is also generated.

Calculated concentrations for such a process are as follows in Table 5. The outlet to carbonate precipitation shows the feed properties of stream 326 for lithium precipitation (with sodium carbonate of stream 352) in FIG. 4.

TABLE 5

| Parameters | Unit | Lithium Recycling Unit Feed/Inlet | Outlet to carbonate precipitation |
|---|---|---|---|
| Volume | m³/h | 1 | 0.08 |
| $Li^+$ | g/L | 1.6 | 14 |
| $Na^+$ | g/L | 55.4 | 16 |
| $SO_4^{(2+)}$ | g/L | 110.3 | 37 |

FIG. 5 is an alternative example of a lithium recycling plant or system 50A according to certain aspects of the present disclosure for recovering lithium from a lithium-ion battery waste stream, which may be used to carry out various aspects of the processes described above. To the extent that the components are the same as those shown in FIG. 1, for brevity, the same reference numbers will be used and the components will not be introduced or discussed again herein unless salient features or functions are pertinent to the variation shown in FIG. 5. The liquid stream 52 is pumped via pump 54 in fluid conduit 56 that establishes fluid communication between the various components in the system 50A into crystallizer unit 70 including one or more coolers (generally shown at 72A) and the crystallizer vessel 74 to cool the liquid stream 52 to solidify sodium sulfate ($Na_2SO_4$). The liquid effluent stream (e.g., supernatant) (third effluent stream) having the solubilized lithium sulfate ($Li_2SO_4$) in the crystallizer vessel 74 of the crystallizer unit 70 may then be removed via a second outlet 82 where it enters the evaporator 60 via inlet 62. Optionally, liquid (e.g., water) separated from the sodium sulfate ($Na_2SO_4$) solids may be removed via a third outlet 83 and optionally combined with the third effluent stream and this combined stream then passes to the downstream evaporator 60. Alternatively, the separated liquid (e.g., water) may be removed via the third outlet 83 and sent to the evaporator 60 without combining it with the third effluent stream.

In the evaporator 60, at least a portion of the water from the third effluent stream is volatilized or evaporated to generate a concentrated liquid or fourth effluent stream and a stream of water vapor or steam. The concentrated liquid stream (fourth effluent stream) passes through the first outlet 64 and water vapor passes out of the evaporator 60 through the second outlet 66. In certain variations, the third effluent stream may be heated prior to entering the evaporator 60 for example, in the heating system 152 (not shown) or by exchanging heat with the liquid stream 52 in one or more coolers (generally shown at 72A). The concentrated liquid stream (fourth effluent stream) having the solubilized lithium sulfate ($Li_2SO_4$) then passes to the downstream lithium recovery unit 90.

FIG. 6 is an alternative example of a lithium recycling plant or system 50B according to certain aspects of the present disclosure for recovering lithium from a lithium-ion battery waste stream, which may be used to carry out various aspects of the processes described above. To the extent that the components are the same as those shown in FIG. 1, for brevity, the same reference numbers will be used and the components will not be introduced or discussed again herein unless salient features or functions are pertinent to the variation shown in FIG. 6. As shown in FIG. 6, a portion of the concentrated liquid stream (fourth effluent stream) may be passed as a reflux stream 140 to a vessel 142 and stored therein. The reflux stream 140 may be combined with the liquid stream 52, for example, for heating the liquid stream 52 in a controlled manner at a constant temperature, prior to introduction into the crystallization unit 70.

Notably, any of the features shown above in various embodiments may be combined with other features even if not explicitly shown in the figures. Further, as will be appreciated by those of skill in the art, conventional components used within the systems may not be shown, including valves, flow rate, temperature, and pressure monitors, actuators, controllers, dryers, conventional accumulators, and the like.

Furthermore, any of the systems described above may include automatic control systems. For example, each system may include a PLC automatic control system (such as those commercially sold by Siemens), which enables automatic adjustment and control of incoming and outgoing material streams according to the set (predetermined) values, the automatic adjustment of the liquid level in the main tank equipment, the feedback of the steam pipeline pressure signal to adjust the steam flow, the system failure automatic alarm, and the like. Such an automation system can greatly reduce allocation of labor force during operation and improves the accuracy and safety of the operation process.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A process for recovering lithium from a lithium-ion battery waste stream, the process comprising:
   solidifying sodium sulfate ($Na_2SO_4$) from a liquid stream comprising lithium sulfate ($Li_2SO_4$), sodium sulfate ($Na_2SO_4$), and water ($H_2O$) present at an initial amount by:
   (i) evaporating a portion of the water in the liquid stream comprising lithium sulfate ($Li_2SO_4$), sodium sulfate ($Na_2SO_4$), and water ($H_2O$) to generate water vapor and an effluent stream; and
   cooling the effluent stream to less than 0° C. and solidifying sodium sulfate ($Na_2SO_4$) from the effluent stream in a crystallizer vessel to generate a second effluent stream; or (ii) cooling the liquid stream to less than 0° C. and solidifying sodium sulfate ($Na_2SO_4$) from the liquid stream in a crystallizer vessel to generate a third effluent stream; and evaporating a portion of the water in the third effluent stream to generate water vapor and a fourth effluent stream;

removing the sodium sulfate ($Na_2SO_4$) solids from the second effluent stream or the third effluent stream;

heating the second effluent stream or the fourth effluent stream and introducing sodium carbonate ($Na_2CO_3$) to the second effluent stream or the fourth effluent stream to produce a lithium carbonate ($Li_2CO_3$) product stream; and separating lithium carbonate ($Li_2CO_3$) from the lithium carbonate ($Li_2CO_3$) product stream, wherein the second effluent stream having concentrated lithium sulfate ($Li_2SO_4$) has greater than or equal to about 70% by weight of the initial amount of water ($H_2O$) removed or the fourth effluent stream having concentrated lithium sulfate ($Li_2SO_4$) has greater than or equal to about 70% by weight of the initial amount of water ($H_2O$) removed.

2. The process of claim 1, further comprising heating the liquid stream prior to the evaporating or heating the third effluent stream prior to the evaporating each to a temperature of greater than or equal to about 90° C.

3. The process of claim 1, wherein the heating the liquid stream further comprises exchanging heat with the water vapor generated during the evaporating or the heating the third effluent stream further comprises exchanging heat with the liquid stream.

4. The process of claim 1, further comprising compressing the water vapor prior to exchanging heat with the liquid stream.

5. The process of claim 1, wherein the heating the second effluent stream or the fourth effluent stream is to a temperature of greater than or equal to about 80° C. to less than about 100° C. and maintaining the temperature during the introducing of sodium carbonate ($Na_2CO_3$).

6. The process of claim 1, wherein the introducing of sodium carbonate ($Na_2CO_3$) provides a stoichiometric excess sodium carbonate ($Na_2CO_3$) of greater than or equal to about 10% to less than or equal to about 15%.

7. The process of claim 1, wherein the cooling the effluent stream or the liquid stream is to a temperature of less than or equal to about −2° C.

8. The process of claim 7, wherein the cooling occurs in multiple cooling stages, wherein a first cooling stage reduces the temperature of the effluent stream or the liquid stream to less than or equal to about 40° C., a second cooling stage reduces the temperature of the effluent stream or the liquid stream to less than or equal to about 30° C., and a third cooling stage reduces the temperature of the effluent stream or the liquid stream to less than or equal to about −2° C.

9. The process of claim 1, wherein the cooling the liquid stream comprises exchanging heat with the third effluent stream generated in the crystallizer vessel.

10. The process of claim 1, wherein the removing the sodium sulfate ($Na_2SO_4$) solids from the second or third effluent stream occurs by centrifuging a byproduct stream comprising the sodium sulfate ($Na_2SO_4$) solids to separate liquids and collect the sodium sulfate ($Na_2SO_4$) solids.

11. The process of claim 1, wherein the lithium carbonate ($Li_2CO_3$) product has a purity level of greater than or equal to about 80% by weight.

12. The process of claim 1, further comprising combining a portion of the fourth effluent stream with the liquid stream.

13. The process of claim 1, wherein the cooling occurs in multiple cooling stages.

14. The process of claim 1, wherein the cooling occurs in a plurality of coolers.

15. A process for recovering lithium from a lithium-ion battery waste stream, the process comprising:

solidifying sodium sulfate ($Na_2SO_4$) from a liquid stream comprising lithium sulfate ($Li_2SO_4$), sodium sulfate ($Na_2SO_4$), and water ($H_2O$) by:

(iii) evaporating a portion of the water in the liquid stream comprising lithium sulfate ($Li_2SO_4$), sodium sulfate ($Na_2SO_4$), and water ($H_2O$) to generate water vapor and an effluent stream; and cooling the effluent stream to less than 0° C. and solidifying sodium sulfate ($Na_2SO_4$) from the effluent stream in a crystallizer vessel to generate a second effluent stream; or (iv) cooling the liquid stream to less than 0° C. and solidifying sodium sulfate ($Na_2SO_4$) from the liquid stream in a crystallizer vessel to generate a third effluent stream; and evaporating a portion of the water in the third effluent stream to generate water vapor and a fourth effluent stream;

removing the sodium sulfate ($Na_2SO_4$) solids from the second effluent stream or the third effluent stream;

heating the second effluent stream or the fourth effluent stream and introducing sodium carbonate ($Na_2CO_3$) to the second effluent stream or the fourth effluent stream to produce a lithium carbonate ($Li_2CO_3$) product stream; and separating lithium carbonate ($Li_2CO_3$) from the lithium carbonate ($Li_2CO_3$) product stream, wherein the second effluent stream having concentrated lithium sulfate ($Li_2SO_4$) has greater than or equal to about 8 g/L of lithium sulfate ($Li_2SO_4$) or the fourth effluent stream having concentrated lithium sulfate ($Li_2SO_4$) has greater than or equal to about 8 g/L.

16. The process of claim 15, further comprising heating the liquid stream prior to the evaporating or heating the third effluent stream prior to the evaporating each to a temperature of greater than or equal to about 90° C.

17. The process of claim 15, wherein the heating the liquid stream further comprises exchanging heat with the water vapor generated during the evaporating or the heating the third effluent stream further comprises exchanging heat with the liquid stream.

18. The process of claim 15, further comprising compressing the water vapor prior to exchanging heat with the liquid stream.

19. The process of claim 15, wherein the heating the second effluent stream or the fourth effluent stream is to a temperature of greater than or equal to about 80° C. to less than about 100° C. and maintaining the temperature during the introducing of sodium carbonate ($Na_2CO_3$) and the introducing of sodium carbonate ($Na_2CO_3$) provides a stoichiometric excess sodium carbonate ($Na_2CO_3$) of greater than or equal to about 10% to less than or equal to about 15%.

20. The process of claim 15, wherein the cooling the effluent stream or the liquid stream is to a temperature of less than or equal to about −2° C.

21. The process of claim 15, wherein the lithium carbonate ($Li_2CO_3$) product has a purity level of greater than or equal to about 80% by weight.

22. The process of claim 15, further comprising combining a portion of the fourth effluent stream with the liquid stream.

23. The process of claim 15, wherein the cooling occurs in multiple cooling stages.

24. The process of claim 15, wherein the cooling occurs in a plurality of coolers.

* * * * *